US005612479A

United States Patent [19]

Hefner, Jr. et al.

[11] Patent Number: 5,612,479

[45] Date of Patent: Mar. 18, 1997

[54] POLYPHENOLS CONTAINING MESOGENIC MOIETIES AS LATERAL SUBSTITUENTS

[75] Inventors: Robert E. Hefner, Jr.; Jimmy D. Earls, both of Lake Jackson, Tex.

[73] Assignee: The Dow Chemical Company, Midland, Mich.

[21] Appl. No.: 291,969

[22] Filed: Aug. 17, 1994

Related U.S. Application Data

[62] Division of Ser. No. 996,457, Dec. 24, 1992, Pat. No. 5,374,769, which is a division of Ser. No. 770,791, Oct. 3, 1991, Pat. No. 5,206,321.

[51] Int. Cl.$^6$ .................. C08G 73/06; C07C 69/76; C07C 65/30; C07C 39/12; C07C 59/40; C07C 65/01

[52] U.S. Cl. ............ 544/88; 544/179; 544/182; 544/193.1; 544/380; 544/387; 546/152; 548/218; 548/310.1; 549/78; 549/374; 549/497; 560/24; 560/55; 560/57; 560/58; 560/76; 562/466; 562/468; 562/476; 564/161; 564/249; 564/271; 564/310; 568/39; 568/308; 568/442; 568/626; 568/717

[58] Field of Search ........................ 560/24, 55, 58, 560/76; 562/466, 468, 476; 544/88, 179, 182, 193.1, 380, 387; 546/152; 548/218, 310.1; 549/78, 374, 497; 564/161, 249, 271, 310; 565/39, 308, 442, 626, 717

[56] References Cited

U.S. PATENT DOCUMENTS

| | | | |
|---|---|---|---|
| 3,448,079 | 6/1969 | Grigat et al. | 525/504 |
| 3,491,060 | 1/1970 | Schminke et al. | 528/126 |
| 3,498,981 | 3/1970 | Culbertson | 544/182 |
| 3,502,617 | 3/1970 | Schminke et al. | 526/611 |
| 3,553,244 | 1/1971 | Grigat et al. | 560/301 |
| 3,574,737 | 4/1971 | Grigat et al. | 558/8 |
| 3,642,725 | 2/1972 | Schminke et al. | 528/422 |
| 3,694,410 | 9/1972 | Ochmke | 528/211 |
| 3,740,348 | 6/1973 | Grigat et al. | 560/301 |
| 3,740,402 | 8/1973 | Grigat et al. | 560/301 |
| 3,755,402 | 8/1973 | Grigat et al. | 560/100 |
| 3,876,607 | 4/1975 | Snell et al. | 523/445 |
| 3,978,028 | 8/1976 | Sundermann et al. | 528/211 |
| 3,994,949 | 11/1976 | Meyer et al. | 560/301 |
| 4,042,567 | 8/1977 | Sundermann | 528/211 |
| 4,046,796 | 9/1977 | Rottloff et al. | 560/301 |
| 4,059,567 | 11/1977 | Sundermann et al. | 525/390 |
| 4,066,577 | 1/1978 | Sundermann et al. | 528/210 |
| 4,094,852 | 6/1978 | Sundermann et al. | 524/210 |
| 4,094,861 | 6/1978 | Sundermann et al. | 528/125 |
| 4,097,455 | 6/1978 | Burkhardt et al. | 528/67 |
| 4,110,364 | 8/1978 | Gaku et al. | 528/170 |
| 4,157,360 | 7/1979 | Prevorsek et al. | 525/439 |
| 4,195,132 | 3/1980 | Sundermann et al. | 521/155 |
| 4,287,014 | 9/1981 | Gaku et al. | 156/306.9 |
| 4,330,669 | 5/1982 | Ikeguchi et al. | 528/289 |
| 4,369,304 | 1/1983 | Gaku et al. | 528/322 |
| 4,370,467 | 1/1983 | Gaku et al. | 528/322 |
| 4,371,689 | 2/1983 | Gaku et al. | 528/162 |
| 4,373,086 | 2/1983 | Ikeguchi | 526/322 |
| 4,383,903 | 5/1983 | Ayano et al. | 522/11 |
| 4,389,516 | 6/1983 | Sugio et al. | 525/534 |
| 4,393,195 | 7/1983 | Gaku et al. | 528/361 |
| 4,396,745 | 8/1983 | Ikeguchi | 525/374 |
| 4,404,330 | 9/1983 | Ikeguchi | 525/374 |
| 4,414,366 | 11/1983 | Wu et al. | 525/439 |
| 4,469,859 | 9/1984 | Gaku et al. | 528/189 |
| 4,477,629 | 10/1984 | Hefner, Jr. | 525/113 |
| 4,486,583 | 12/1984 | Takahashi et al. | 560/301 |
| 4,528,366 | 7/1985 | Woo et al. | 528/422 |
| 4,544,704 | 10/1985 | Hefner, Jr. | 525/108 |
| 4,554,346 | 11/1985 | Gaku et al. | 525/363 |
| 4,555,563 | 11/1985 | Hefner, Jr. et al. | 528/96 |
| 4,558,115 | 12/1985 | Hefner, Jr. | 528/92 |
| 4,559,399 | 12/1985 | Hefner, Jr. | 528/120 |
| 4,578,439 | 3/1986 | Hefner, Jr. | 525/509 |
| 4,581,425 | 4/1986 | Hefner, Jr. | 526/72 |
| 4,585,855 | 4/1986 | Gaku et al. | 528/322 |
| 4,600,760 | 7/1986 | Hefner, Jr. | 526/202 |
| 4,604,452 | 8/1986 | Shimp | 528/422 |
| 4,608,434 | 8/1986 | Shimp | 528/422 |
| 4,612,359 | 9/1986 | Hefner et al. | 528/97 |
| 4,631,319 | 12/1986 | Blahak et al. | 525/437 |
| 4,665,154 | 5/1987 | Varnell et al. | 528/205 |
| 4,680,378 | 7/1987 | Hefner, Jr. | 528/322 |
| 4,683,276 | 7/1987 | Hefner, Jr. | 526/202 |
| 4,709,008 | 11/1987 | Shimp | 528/422 |
| 4,713,442 | 12/1987 | Woo et al. | 528/422 |
| 4,731,426 | 3/1988 | Hefner, Jr. | 526/262 |
| 4,738,900 | 4/1988 | Ono et al. | 560/301 |
| 4,740,584 | 4/1988 | Shimp | 528/422 |
| 4,745,215 | 5/1988 | Cox et al. | 560/301 |
| 4,746,727 | 5/1988 | Bogan et al. | 528/392 |
| 4,749,760 | 6/1988 | Wang | 525/471 |
| 4,751,323 | 6/1988 | Woo et al. | 560/301 |
| 4,754,001 | 6/1988 | Blahak et al. | 525/437 |
| 4,769,440 | 9/1988 | Hefner, Jr. | 528/322 |
| 4,774,282 | 9/1988 | Zureshi | 524/606 |
| 4,774,316 | 9/1988 | Godschalx et al. | 528/205 |
| 4,777,226 | 10/1988 | Holte | 525/534 |
| 4,782,116 | 11/1988 | Holte | 525/109 |
| 4,806,625 | 2/1989 | Bogan et al. | 528/422 |

FOREIGN PATENT DOCUMENTS

6094422  5/1985  Japan .

OTHER PUBLICATIONS

Clemical Abstract. vol. 101 No. 14971, Leppard et al, 1984, "Color photographic recording material containing poly-alkylpiperidines as light stabilizers".

*Primary Examiner*—Bernard Dentz
*Assistant Examiner*—Raymond Convington

[57] ABSTRACT

Novel polycyanate compositions containing one or more mesogenic moieties as lateral substituents are disclosed which provide improved processability relative to polycyanates containing one or more mesogenic moieties in the main chain of the molecule. Molecular level ordering of the resulting thermosets is maintained much similar to that found thermosets of polycyanates which have one or more mesogenic moieties in the main chain.

2 Claims, No Drawings

POLYPHENOLS CONTAINING MESOGENIC MOIETIES AS LATERAL SUBSTITUENTS

CROSS-REFERENCE TO RELATED APPLICATIONS

This application is a division of application Ser. No. 07/996,457 filed Dec. 24, 1992, now U.S. Pat. No. 5,374,769 which is a division of application Ser. No. 07/770,791 filed Oct. 3, 1991, now U.S. Pat. No. 5,206,321, all of which are incorporated herein by reference in their entirety.

FIELD OF THE INVENTION

The present invention concerns polycyanates containing one or more mesogenic moieties as lateral substituents and thermosets thereof.

BACKGROUND OF THE INVENTION

Aromatic polycyanates which are thermosettable to polytriazines are known, for example, from U.S. Pat. Nos. 3,448,079; 3,553,244; 3,694,410; 3,740,348; 3,755,402; 4,094,852 and 4,097,455. Aromatic polycyanates containing one or more mesogenic moieties in the main chain of the molecule which are thermosettable to polytriazines are known from copending application Ser. No. 07/380,938 filed Jul. 17, 1989.

Although the aforementioned aromatic polycyanates containing one or more mesogenic moieties in the main chain of the molecule provide cured products having excellent physical properties, they are often very difficult to process due to their relatively high melting temperatures. Thus, for example, when the mesogenic moiety is a benzanilide group present in the main chain of the dicyanate of 4,4'-dihydroxybenzanilide, melt flow to a birefringent fluid is not observed until 184° C. In the present invention, when the benzanilide group is attached as a side chain to the dicyanate, melt flow to a shear birefringent fluid is observed at 69° C. Therefore, it would be desirable to have available aromatic polycyanates containing one or more mesogenic moieties attached as lateral substituent(s) to provide lower melting temperatures which would lead to easier processing.

The present invention provides a method for attachment of one or more mesogenic moieties to a polycyanate as lateral substituent(s). Incorporation of said mesogenic moieties can lead to a molecular level ordering of the polytriazine thermoset (cured) composition thereof much similar to that found in the thermoset (cured) aromatic polycyanates which have one or more mesogenic moieties in the main chain. However, due to their relatively lower melting temperatures, the polycyanates of the present invention in which the one or more mesogenic moieties are lateral substituents can provide improved processibility.

SUMMARY OF THE INVENTION

The present invention pertains to polycyanate compositions containing one or more mesogenic moieties as lateral substituents.

Another aspect of the present invention pertains to compositions resulting from curing (thermosetting) one or more of the polycyanates containing one or more mesogenic moieties as lateral substituents, optionally in the presence of one or more curing agents and/or curing catalysts.

Another aspect of the present invention is directed to polymerizable compositions comprising a mixture containing (A) at least one thermosettable polycyanate containing one or more mesogenic moieties as lateral substituents; and (B) at least one of (1) at least one polycyanate or polycyanamide containing one or more mesogenic moieties in the main chain of the molecule and/or at least one polycyanate or polycyanamide which does not contain mesogenic moieties;

(2) at least one epoxy resin;

(3) at least one polymaleimide;

(4) at least one polyamine;

(5) at least one polyphenol;

(6) at least one compound containing one or more polymerizable ethylenically unsaturated group(s);

(7) at least one compound which contains in the same molecule both a cyanate or cyanamide group and a polymerizable ethylenically unsaturated group;

(8) at least one compound which contains in the same molecule both a 1,2-epoxide group and a polymerizable ethylenically unsaturated group;

(9) at least one compound which contains in the same molecule both a maleimide group and a cyanate group;

(10) at least one compound which contains one or more mesogenic moieties and only one cyanate or cyanamide group per molecule;

(11) at least one prepolymer of any of the aforesaid components (1) through (10) or any combination of any two or more of said components; or

(12) a mixture of any two or more of components (1) through (11) in any proportion and any combination.

Another aspect of the present invention pertains to compositions resulting from polymerizing the aforementioned polymerizable compositions.

A further aspect of the present invention pertains to products resulting from orienting any of the aforementioned polymerizable compositions.

DETAILED DESCRIPTION OF THE INVENTION

Definitions

The term "hydrocarbyl" as employed herein means any aliphatic, cycloaliphatic, aromatic, aryl substituted aliphatic or cycloaliphatic, or aliphatic or cycloaliphatic substituted aromatic groups. The aliphatic or cycloaliphatic groups can be saturated or unsaturated. When applied to the A' group of $T^2$, the hydrocarbyl group can also contain one or more heteroatoms selected from N, O, S and the like. Likewise, the term "hydrocarbyloxy" means a hydrocarbyl group having an oxygen linkage between it and the carbon atom to which it is attached.

The term "lateral" means that the object which it modifies, such as a dicyanate molecule, is in a position pending, protruding or dangling from the main chain of the polycyanate.

The term "prepolymer(s)" or "prepolymerizate" as employed herein means that the compound has been homooligomerized or cooligomerized or interoligomerized or homopolymerized or copolymerized or interpolymerized so as to cause an increase in molecular weight, but not to such an extent that the product has become cured, i.e. insoluble and infusible, but rather, the product is capable of being subsequently cured to an insoluble, infusible state.

Polycyanates Containing Mesogenic Moieties as Lateral Substituents

Suitable polycyanates of the present invention which contain one or more mesogenic moieties as lateral substituents include those represented by the following Formula I:

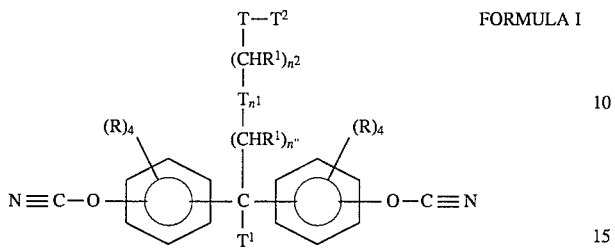

FORMULA I wherein each R is independently hydrogen or a hydrocarbyl or hydrocarbyloxy group having from 1 to about 10, preferably from 1 to about 4, carbon atoms, a halogen atom, preferably chlorine or bromine, a nitro group, a nitrile group, a phenyl group or a —CO—$R^1$ group; each $R^1$ is independently hydrogen or a hydrocarbyl group having 1 to about 3 carbon atoms; $n^1$ has a value of zero or one and $n^2$ has a value of zero to about 10, with the proviso that when $n^1$ has a value of 1, $n^2$ has a value of 1 to about 10; $n''$ independently has a value of zero to about 10, preferably of zero to about 4; each T is independently a —$NR^1$—, —O—, —S—, —CO—O—, —O—CO—, —$NR^1$—CO— or —CO—$NR^1$— group; $T^1$ is —H, —$(CHR^1)_{n''}$—$CH_2R^1$ or —$(CHR^1)_{n''}$—$(T)_{n^1}$—$(CHR^1)_{n^2}$—T—$T^2$; and $T^2$ is a

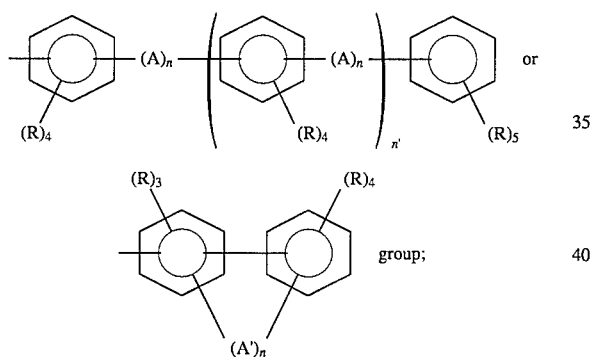

group;

wherein at least about 80 percent of the —A— linkages, the direct bond and the aromatic ring bonding position are in the para position with respect to each other; each A is independently —$CR^1$=$CR^1$—, —C≡C—, —N=N—, —$CR^1$=N—, —O—CO—, —$NR^1$—CO—, —$CR^1$=N—N=$CR^1$—, —$CR^1$=$CR^1$—CO—, —CO—O—, —CO—$NR^1$—, —CO—$CR^1$=$CR^1$—, —$CR^1$=$CR^1$)—O—CO—$(CH_2)_{n'}$—, —N=$CR^1$—, —$(CH_2)_n$—CO—O—$CR^1$=$CR^1$—, —$CR^1$=$CR^1$—O—CO—, —CO—O—$CR^1$=$CR^1$—, —O—CO—O—N=$CR^1$—, —$CR^1$=N—O—CO—, —$CR^1$=$CR^1$—CO—O—, —CO—S—, —O—CO—$CR^1$=$CR^1$—, —$CR^1$=$CR^1$—CO—O—$(CH_2)_{n'}$—, —S—CO—, —$(CH_2)_{n'}$—O—CO—$CR^1$=$CR^1$—, —$CHR^1$—$CHR^1$—CO—O—, —O—CO—$CHR^1$—$CHR^1$—, —C≡C—C≡C—, —$CR^1$=$CR^1$—$CR^1$=$CR^1$—, —CO—$NR^1$—$NR^1$—CO—,

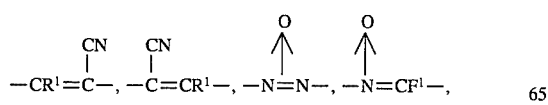

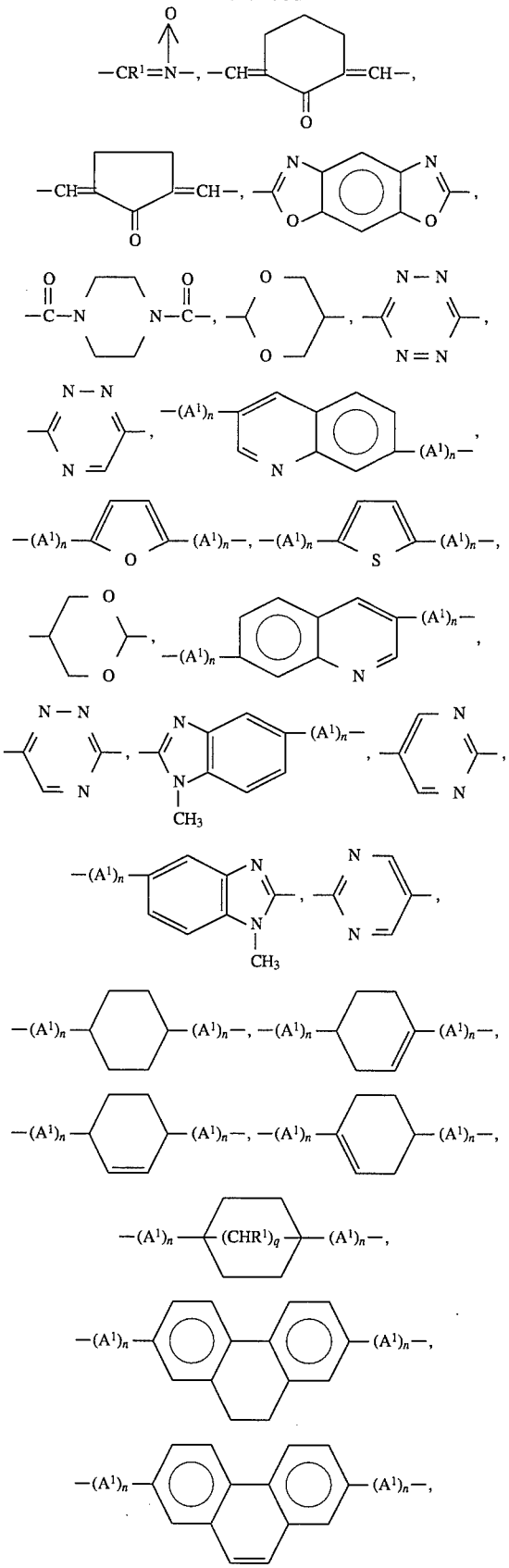

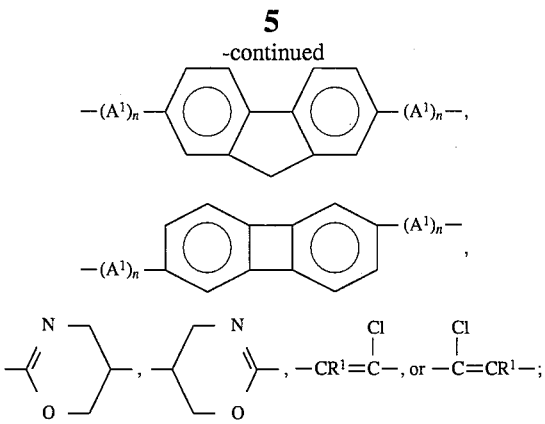

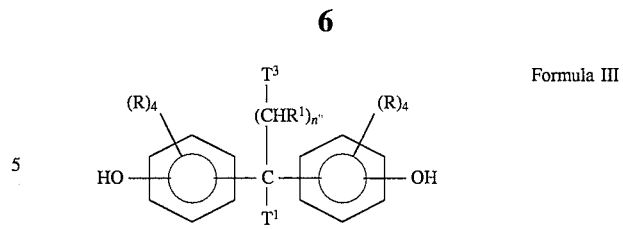
Formula III wherein each R, $R^1$ and n" are as hereinbefore defined, $T^1$ is —H or —(CHR$^1$)n"—CHR$^1$, and $T^3$ is a —CO—OH group; with a mesogen-containing monoalcohol compound represented by the following Formula IV

$T^2$—$T^4$                                       Formula IV wherein each $R^1$, T, $T^2$ and $n^2$ are as hereinbefore defined and $T^4$ is —T—(CHR$^1$)$_{n^2}$—OH or —OH.

The polyphenols containing one or more mesogenic moieties as lateral substituents provided by the aforesaid esterification reaction are thus represented by the following Formula V

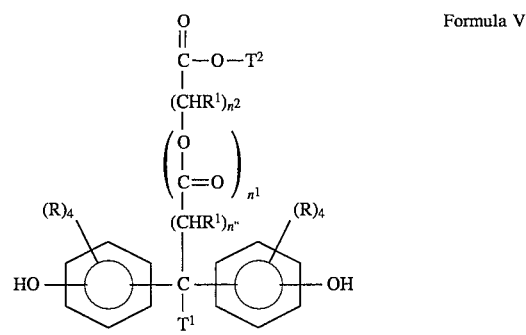
Formula V wherein R, $R^1$, $T^1$, $T^2$, $n^1$, $n^2$ and n" are as hereinbefore defined with the proviso that when $n^1$ has a value of 1, $n^2$ has a value of 1 to about 10.

The esterification reaction of a diphenolic monoacid compound with a mesogen-containing monoalcohol compound can be completed using well known methods, such as, for example, those described in *Advanced Organic Chemistry*, 3rd edition, by Jerry March published by John Wiley and Sons, New York (1985) on pages 348 to 353 and in *Vogel's Textbook of Practical Organic Chemistry*, 4th edition (revised), by Arthur Vogel published by William Clowes Limited, London (1984) on pages 501 to 504, both of which are incorporated herein by reference. If the mesogenic containing monoalcohol compound of Formula IV is a monophenol ($T^4$ is —OH), it is necessary to protect the phenolic hydroxyl groups of the diphenolic monoacid compound represented by Formula III prior to performing the aforesaid esterification reaction.

Suitable cyanogen halides include, for example, cyanogen chloride and cyanogen bromide. Alternatively, the cyanogen halide can be formed in situ from sodium cyanide and a halogen such as chlorine or bromine at a temperature of from about –5° C. to about 5° C., in the presence of water as a solvent. The formation of the cyanogen halides in situ is described by Martin and Bauer in *Organic Synthesis*, volume 61, pages 35–68 (1983) published by John Wiley and Sons which is incorporated herein by reference.

Suitable base compounds which can be employed to prepare the polycyanates of the present invention include, for example, both inorganic bases and tertiary amines such as sodium hydroxide, potassium hydroxide, trimethylamine, triethylamine, or any combination thereof and the like. Triethylamine is most preferred as the base.

Suitable solvents which can be employed to prepare the polycyanates of the present invention include, for example, each A' is independently a divalent hydrocarbyl group having from 1 to about 10, preferably from 1 to about 4, carbon atoms; each $A^1$ is independently a —CO—, —O—CO—, —CO—O—, —CO—NR$^1$—, or —NR$^1$—CO—group; n has a value of zero or one; n' has a value from 1 to about 6, preferably 1 to about 3; and q has a value of 1 or 2. The aromatic rings can also contain one or more heteroatoms selected from N, O, S and the like.

Preparation of the Polycyanates Containing One or More Mesogenic Moieties as Lateral Substituents The polycyanates of the present invention are prepared by reacting one or more of the polyphenols containing one or more mesogenic moieties as lateral substituents with a stoichiometric quantity or a slight stoichiometric excess (up to about 20 percent excess) of a cyanogen halide per —OH group in the presence of a stoichiometric quantity or a slight stoichiometric excess (up to about 20 percent excess) of a base compound per —OH group and in the presence of a suitable solvent.

Reaction temperatures of from about –40° C. to about 60° C. are operable, with reaction temperatures of –15° C. to 10° C. being preferred. Reaction times can vary substantially, for example, as a function of the reactants being employed, the reaction temperature, solvent(s) used, the scale of the reaction, and the like, but are generally between 15 minutes and 4 hours, with reaction times of 30 minutes to 90 minutes being preferred.

Suitable polyphenols,.which can be employed herein to prepare the polycyanates containing one or more mesogenic moieties as lateral substituents include any compound which has an average of more than one aromatic hydroxyl group and containing one or more mesogenic moieties as lateral substituents and include, for example, those represented by Formula II

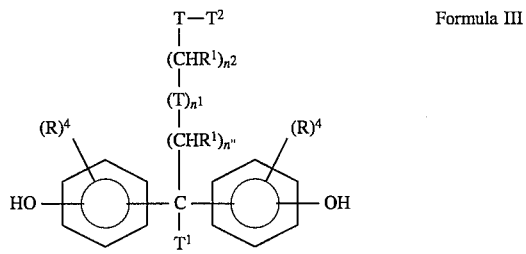
Formula III wherein each R, $R^1$, $n^1$, $n^2$, n", T, $T^1$ and $T^2$ are as hereinbefore defined. The aromatic rings can also contain one or more heteroatoms selected from N, O, S and the like.

One particularly suitable class of polyphenols containing one or more mesogenic moieties as lateral substituents are prepared by esterification reaction of a diphenolic monoacid compound represented by the following Formula III water, aliphatic ketones, chlorinated hydrocarbons, aliphatic and cycloaliphatic ethers and diethers, aromatic hydrocarbons, or any combination thereof and the like. Acetone, methylethylketone, methylene chloride or chloroform are particularly suitable as the solvent.

Curing of the Polycyanates Containing One or More Mesogenic Moieties as Lateral Substituents The polycyanates containing one or more mesogenic moieties as lateral substituents are cured (thermoset) by heating from about 50° C. to about 400° C., preferably by heating from 100° C. to 250° C., optionally in the presence of a suitable catalyst. Suitable catalysts include, for example, acids, bases, salts, nitrogen and phosphorus compounds, such as for example, Lewis acids such as $AlCl_3$, $BF_3$, $FeCl_3$, $TiCl_4$, $ZnCl_2$, $SnCl_4$; protonic acids such as HCl, $H_3PO_4$; aromatic hydroxy compounds such as phenol, p-nitrophenol, pyrocatechol, dihydroxynaphthalene; sodium hydroxide, sodium methylate, sodium phenolate, trimethylamine, triethylamine, tributylamine, diazabicyclo-[2.2.2] octane, quinoline, isoquinoline, tetrahydroisoquinoline, tetraethylammonium chloride, pyridine-N-oxide, tributyl phosphine, zinc octoate, tin octoate, zinc naphthenate, cobalt naphthenate, cobalt octoate, cobalt acetylacetonate and the like. Also suitable as catalysts are the metal chelates such as, for example, the chelates of transition metals and bidentate or tridentate ligands, particularly the chelates of iron, cobalt, zinc, copper, manganese, zirconium, titanium, vanadium, aluminum and magnesium. These and other operable catalysts are disclosed in U.S. Pat. Nos. 3,694,410 and 4,094,852 which are incorporated herein by reference in their entirety. Cobalt naphthenate, cobalt octoate and cobalt acetylacetonate are most preferred as the catalysts. The quantity of catalyst used, if any, depends on the structure of the particular catalyst, the structure of the polycyanate being cured, the cure temperature, the cure time, and the like. Generally, catalyst concentrations of from about 0.001 to about 2 percent by weight are preferred.

B-staging or prepolymerization of the compositions of the polycyanates of the present invention can be accomplished by using lower temperatures and/or shorter curing times. Curing of the thus formed B-staged (prepolymerized) resin can then be accomplished at a later time or immediately following B-staging (prepolymerization) by increasing the temperature and/or curing time.

The cured (thermoset) products prepared from the polycyanates containing one or more mesogenic moieties as lateral substituents possess the cyanate group homopolymerization structure

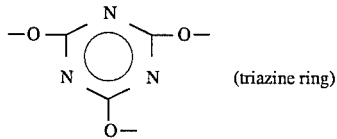

(triazine ring)

unless other functionalities are present in the polycyanate that participate in the curing process.

Polycyanates or Polycyanamides Which Can Be Employed in the Curable and Cured Compositions Suitable polycyanates or polycyanamides which do not contain mesogenic moieties and which can be employed to prepare the polymerizable mixtures of the present invention include, for example, those represented by the following Formulas VI, VII, VIII, and IX

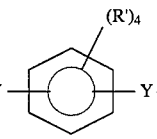

Formula VI

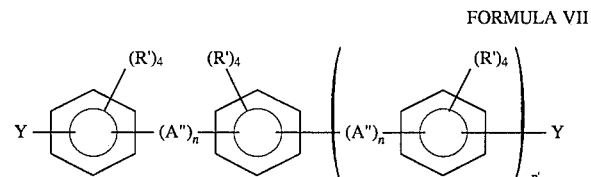

FORMULA VII

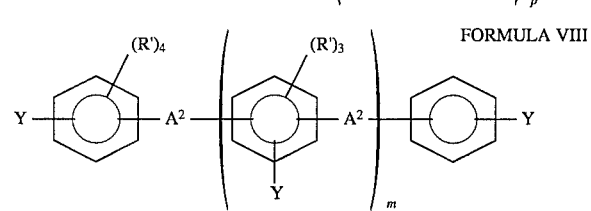

FORMULA VIII

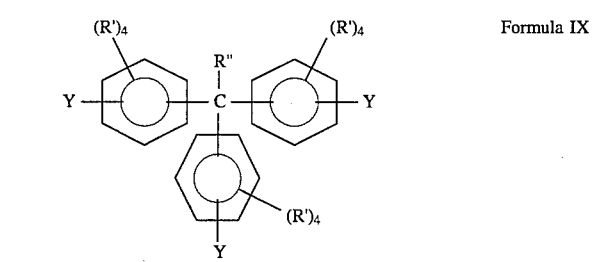

Formula IX wherein n and $R^1$ are as hereinbefore defined; each Y is independently a —O—C≡N or a —$NR^1$—C≡N group; each A" is independently an alkylene group having from 1 to about 10 carbon atoms, preferably from 1 to about 4 carbon atoms, a direct bond, —O—, —CO—, —S—, —S—S—, —SO—, —$SO_2$— or —O—CO—O—; each $A^2$ is independently an alkylene group having from 1 to about 10, preferably from 1 to about 4 carbon atoms or a

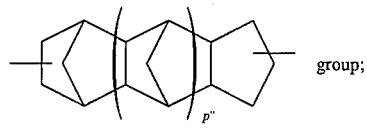 group;

each R' is independently hydrogen, a hydrocarbyl or hydrocarbyloxy group having from 1 to about 10, preferably 1 to about 4 carbon atoms, a halogen, preferably chlorine or bromine, a phenyl group, a —O—C≡N group, or a —$NR^1$—C≡N group; each R" is independently hydrogen, a hydrocarbyl or hydrocarbyloxy group having from 1 to about 10, preferably 1 to about 4 carbon atoms, a halogen, preferably chlorine or bromine, or a phenyl group; p' has a value from zero to about 100, preferably from zero to about 30; p" has a value of from zero to about 10, preferably from zero to 3 and m has a value of from about 0.001 to about 6, preferably from about 0.01 to about 3. The aromatic rings can also contain one or more heteroatoms selected from N, O, S and the like.

Suitable polycyanates or polycyanamides which contain mesogenic moieties in the main chain of the molecule and which can be employed to prepare the polymerizable mixtures of the present invention include, for example, those represented by the following Formulas X, XI, XII, and XIII.

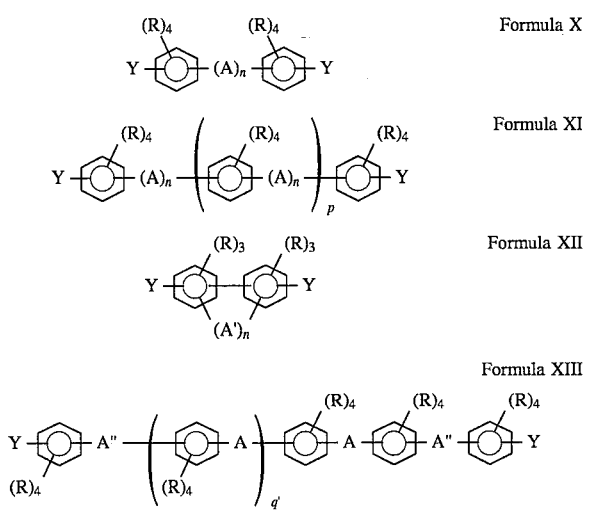

Formula X

Formula XI

Formula XII

Formula XIII wherein at least about 80 percent of the —A— linkages, the direct bond in Formula XII and the Y groups are in the para position with respect to each other; wherein R, Y, A, A', A" and n are as hereinbefore defined; p has a value from 1 to about 30, preferably from 1 to about 3 and q' has a value of from zero to about 6, preferably from zero to 1.

Particularly suitable polycyanates or polycyanamides which do not contain mesogenic structures represented by Formulas VI, VII, VIII and IX include, for example, bisphenol A dicyanate, the dicyanates of 4,4'-dihydroxydiphenyl, 4,4'-dihydroxydiphenyl oxide, resorcinol, hydroquinone, 4,4'-thiodiphenol, 4,4'-sulfonyldiphenol, 3,3',5,5'-tetrabromobisphenol A, 2,2',6,6'-tetrabromobisphenol A, 2,2'-dihydroxydiphenyl, 3,3'-dimethoxybisphenol A, 4,4'-dihydroxydiphenylcarbonate, dicyclopentadiene diphenol, 4,4'-dihydroxybenzophenone, 4,4'-dihydroxydiphenyl methane, tricyclopentadiene diphenol, the tricyanate of tris(hydroxyphenyl)methane, the tetracyanate of 2,2',4,4'-tetrahydroxydiphenyl methane, the polycyanate of a phenolformaldehyde condensation product (novolac), the polycyanate of a dicyclopentadiene and phenol condensation product, the dicyanamide of 4,4'-diaminodiphenyl methane, the cyanate/cyanamide of p-aminophenol, or any combination thereof and the like.

Suitable polycyanates or polycyanamides which contain mesogenic moieties in the main chain of the molecule represented by Formulas X. XI, XII and XIII include, for example , the dicyanates of 4,4'-dihydroxyalpha-methylstilbene, 4,4'-dihydroxychalcone, 4,4-dihydroxydiphenylacetylene, 4,4'-dihydroxydiphenylazomethine, 4,4'-dihydroxyazobenzene, 4,4'-dihydroxyazoxyb enzene, 4,4'-bis(4-hydroxyphenoxy)diphenyl, 4,4'-dihydroxy-alpha-cyanostilbene, 4,4'-dihydroxybenzanilide, 4-hydroxyphenyl-4-hydroxybenzoate, 4,4'-dihydroxy-alpha,alpha'-dimethylstilbene, 4,4'-dihydroxychalcone, 4,4'-dihydroxystilbene, 4,4'-dihydroxydiphenyl, 4'4-dihydroxy-alpha-chlorostilbene, 3,3'-dimethyl-4,4'-dihydroxystilbene, the dicyanamides of 4,4'-diaminostilbene, 4,4'-diaminophenyl benzoate, 4,4' -diamino-alpha-methylstilbene, the cyanate/cyanamide of 4-amino-4'-hydroxybenzanilide, 4-amino-4'-hydroxystilbene, or any combination thereof and the like.

The polycyanates or polycyanamides which do not contain mesogenic moieties or which contain mesogenic moieties in the main chain of the molecule are prepared using the corresponding polyphenol, polyamine or aminophenol precursor and the previously described cyanation (cyanamidation) chemistry. As a specific process unique to the present invention, mixtures of one or more polyphenols, polyamines or aminophenols which do not contain mesogenic moieties or which contain mesogenic moieties in the main chain of the molecule with one or more polyphenols which contain one or more mesogenic moieties as lateral substituents may be cyanated (cyanamidated) to provide a polymerizable mixture of the present invention.

Epoxy Resins which can be Employed in the Curable and Cured Compositions

Suitable epoxy resins which can be employed to prepare the polymerizable mixtures of the present invention include materials having an average of more than one vicinal epoxide group per molecule, such as, for example, the epoxy resins represented by the following Formulas XIV, XV, XVI, XVII, XVIII, XIX, XX, XXI, XXII, XXIII

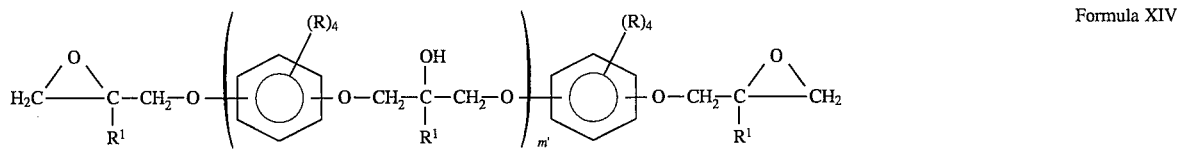

Formula XIV

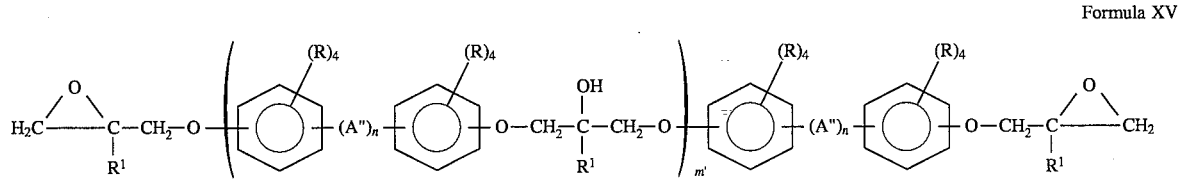

Formula XV

-continued
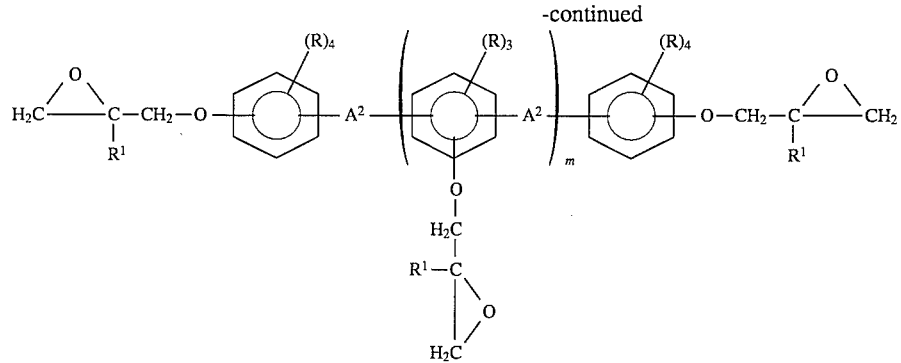
Formula XVI
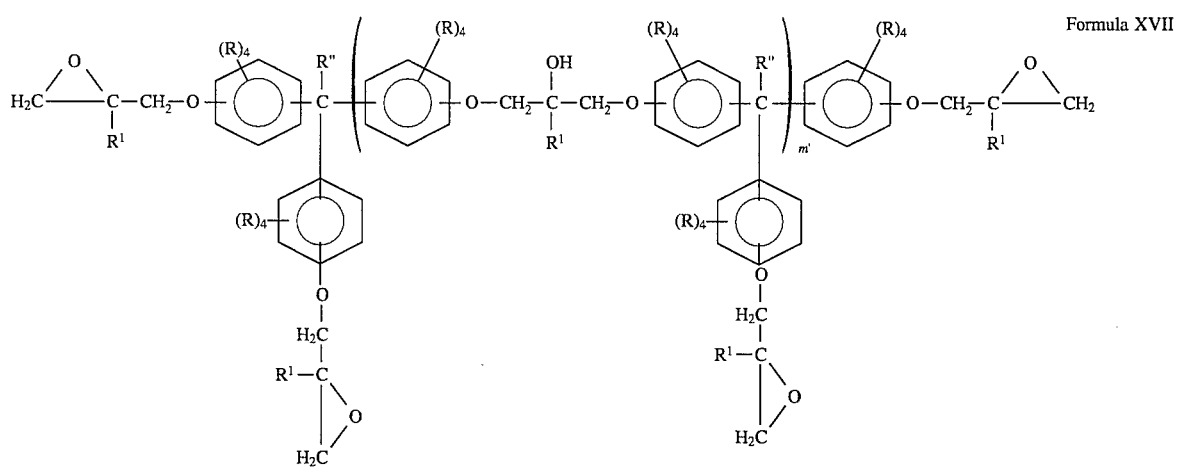
Formula XVII
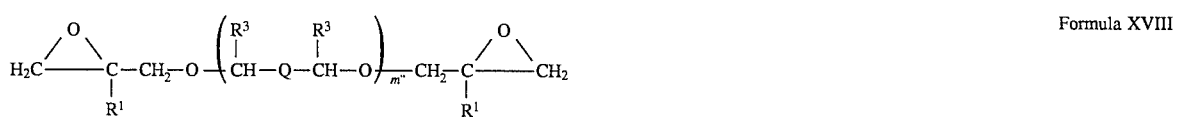
Formula XVIII
Formula XIX
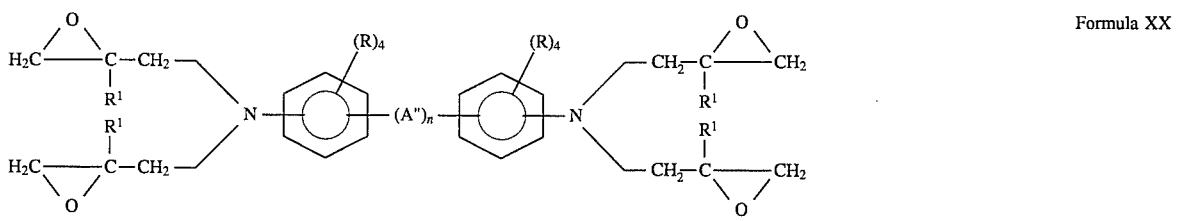
Formula XX
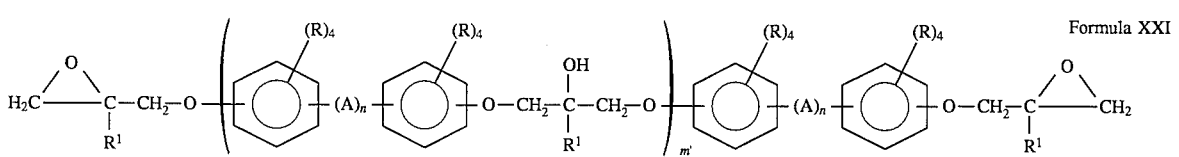
Formula XXI

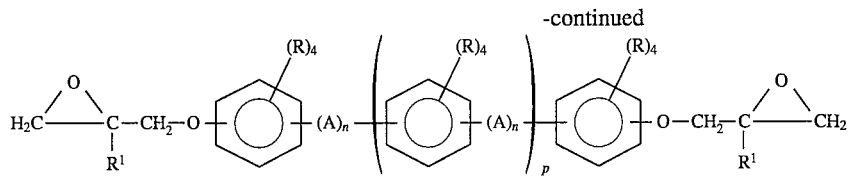

Formula XXII

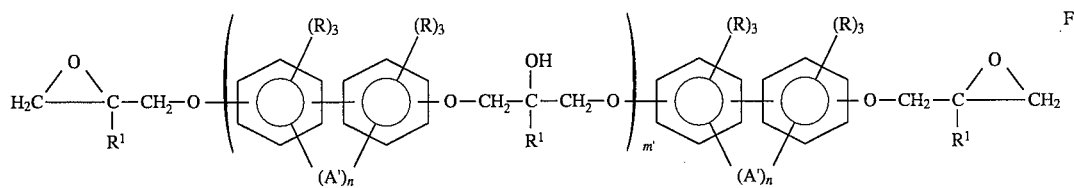

Formula XXIII wherein A, A², A', A", R, R¹, R", m, n and p are as hereinbefore defined; each R³ is independently hydrogen, or a hydrocarbyl or halohydrocarbyl group having from 1 to about 6, preferably 1 to about 2 carbon atoms; Q is a direct bond, —$CH_2$—S—$CH_2$—, —$(CH_2)_{q''}$—, or

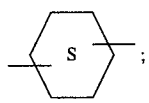

m' has a value of from zero to about 30, preferably from about zero to about 5; m" has a value from 1 to about 10, preferably from about 1 to about 4 and q" has an average value from about 1 to about 10. The aromatic rings can also contain one or more heteroatoms selected from N, O, S and the like.

Particularly suitable epoxy resins represented by Formulas XIV, XI, XVI, XVII, XVIII, XIX, XX, XXI, XXII and XXIII are the diglycidyl ethers of resorcinol, hydroquinone, dihydroxydiphenyl methane, bisphenol A, 3,3',5,5'-tetrabromobisphenol A, 4,4'-sulfonyldiphenol, 4,4'-thiodiphenol, 4,4'-dihydroxydiphenyl oxide, 4,4'-dihydroxybenzophenone, 2,2'-dihydroxydiphenyl, dicyclopentadiene diphenol, tricyclopentadiene diphenol, 4,4'-dihydroxydiphenyl, 4,4'-dihydroxystilbene, 4,4'-dihydroxy-alpha-methylstilbene, 4,4'-dihydroxy-alpha-cyanostilbene, 4,4'-dihydroxychalcone, 4,4'-dihydroxydiphenylacetylene, 4,4'-dihydroxydiphenylazomethine, 4,4'-dihydroxyazobenzene, 4,4'-bis(4-hydroxyphenoxy)diphenyl, 4,4'-dihydroxybenzanilide, ethylene glycol, thiodiglycol, diethylene glycol, dipropylene glycol, polypropylene glycol, polyethylene glycol, 1,4-cyclohexanediol, dibutylene glycol, the advancement reaction product of the diglycidyl ether of bisphenol A and bisphenol A, the advancement reaction product of the diglycidyl ether of 4,4'-dihydroxy-alpha-methylstilbene and 4,4'-dihydroxy-alpha-methylstilbene, the triepoxide of p-aminophenol, the tetraepoxide of 4,4'-diaminodiphenyl methane, the triglycidyl ether of tris(hydroxyphenyl)methane, the tetraglycidyl ether of 2,2',4,4'-tetrahydroxydiphenyl methane, the polyglycidyl ether of a phenolformaldehyde condensation product (novolac), the polyglycidyl ether of a dicyclopentadiene or oligomer thereof and phenol or halogen or alkyl substituted phenol condensation product, or any combination thereof and the like.

The aforementioned epoxy resins can be prepared by reaction of a polyphenol, polyamine, aminophenol, or polyalkylene glycol with an epihalohydrin and a basic acting material. Said reaction generally involves two distinct steps: coupling reaction of the epihalohydrin and polyphenol to provide a halohydrin intermediate and dehydrohalogenation reaction of the halohydrin intermediate to provide the glycidyl ether product. Suitable catalysts and reaction conditions for preparing epoxy resins are described in the *Handbook of Epoxy Resins* by Lee and Neville, McGraw-Hill (1967) which is incorporated herein by reference.

Polymaleimides for Use in the Curable and Cured Compositions

Suitable polymaleimides which can be employed to prepare the polymerizable mixtures of the present invention include, for example, those represented by the following Formulas XXIV, XXV, XXVI, XXVII, XXVIII, XXIX, XXX, XXXI

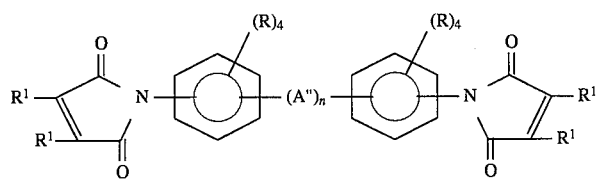

Formula XXIV

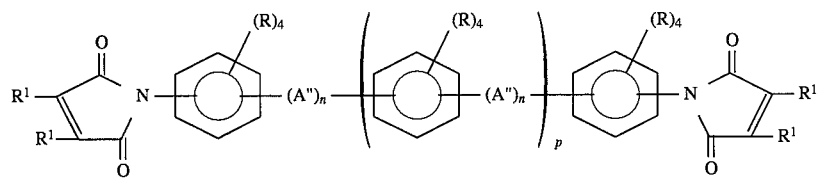

Formula XXV

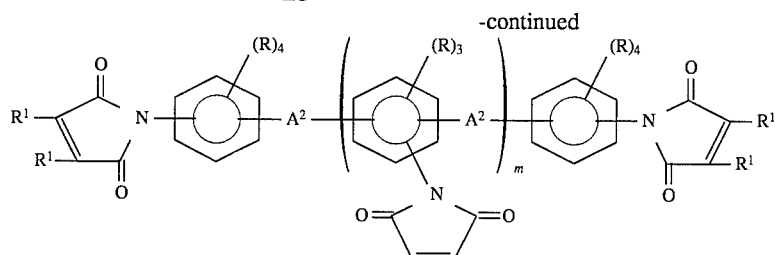

Formula XXVI

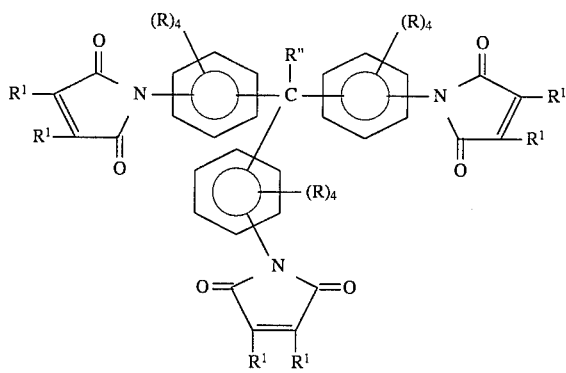

Formula XXVII

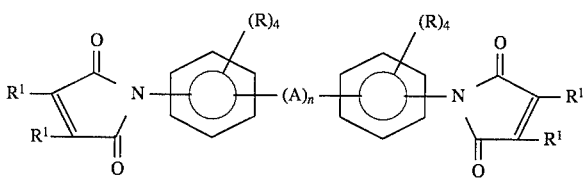

Formula XXVIII

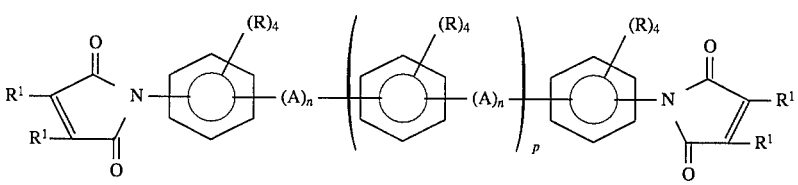

Formula XXIX

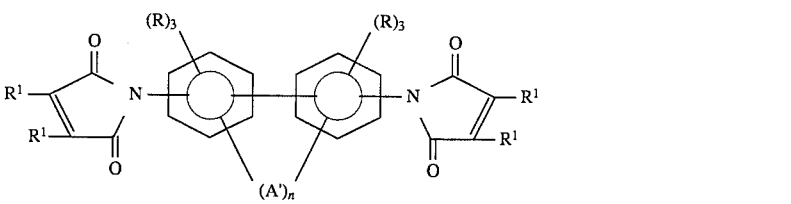

Formula XXX

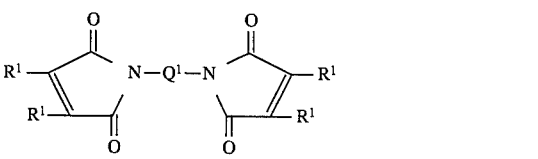

Formula XXXI

wherein A., $A^2$, A', A", R, $R^1$, R", m, n and p are as hereinbefore defined and $Q^1$ is a divalent hydrocarbyl group having from 2 to about 12 carbon atoms and may be linear or branched aliphatic, cycloaliphatic or polycycloaliphatic. The aromatic rings can also contain one or more heteroatoms selected from N, O, S and the like.

Particularly suitable polymaleimides represented by Formulas XXIV, XXV, XXVI, XXVII, XXVIII. XXIX, XXX and XXXI are N,N'-ethylenebismaleimide, N,N'-ethylenebis(2-methylmaleimide), N,N'-hexamethylenebismaleimide, N,N'-(oxydi-p-phenylene)bismaleimide, N,N'-(methylenedi-p-phenylene)maleimide, N,N'-(methylenedi-p-phenylene)bis(2-methylmaleimide), N,N'-(thio-di-p-phenylene)bismaleimide, N,N'-(sulfonyldi-m-phenylene)bismaleimide, N,N'-(isopropylidenedi-p-phenylene)bismaleimide, polymethylene polyphenylene polymaleimides, the bismaleimide of 4,4'-diaminostilbene, the bismaleimide of 4,4'-diaminobenzanilide, or any combination thereof and the like.

The polymaleimides can be prepared by reacting a stoichiometric quantity of a maleic anhydride per amine group with a polyamine in the presence of a suitable solvent, such as, for example, aromatic hydrocarbons, chlorinated hydrocarbons or N,N-dimethylformamide at a temperature of from about −10° C. to about 150° C. The polymaleamic acid resulting from reaction of a maleic anhydride and a polyamine may be isolated and dehydrated to the desired polymaleimide. Alternatively, the reaction may be performed in a single continous step. Detailed procedures for preparing polymaleimides can be found in U.S. Pat. Nos. 2,444,536; 2,462,835; and *Journal of Polymer Science: Part A: Polymer Chemistry*, Vol. 27, pages 375–388 (1989) which are incorporated herein by reference.

Polyamines Suitable for Use in the Curable and Cured Compositions

Suitable polyamines which can be employed to prepare the polymerizable mixtures of the present invention, include those containing one or more of the mesogenic moieties already described herein, as well as any of the other known polyamines which do not contain mesogenic moieties. Particularly suitable polyamines containing one or more mesogenic moieties include 4,4'-diaminostilbene, 4,4'-diaminobenzanilide, 3,3'-dimethyl-4,4'-diaminobiphenyl, 4,4'-diaminodiphenylacetylene, 4,4'-diaminodiphenylazomethine, 4,4'-diaaminoazobenzene, 4,4'-diaminoazoxybenzene, 4,4'-diamino-alphamethylstilbene, 4,4'-diamino-alpha-cyanostilbene, 4,4'-diamino-alpha-chlorostilbene and the like. Typical representatives of said polyamines free of mesogenic moieties include 1,4-diamino-butane, 1,6-hexanediamine, 1,12-diaminododecane, 2-methyl-4-ethyl-1,8-diaminooctane, 1,4-diamino-cyclohexane, 4,4'-diaminodiphenyl methane, 1,4-diaminobenzene, tris(aminophenyl)methane, aniline-formaldehyde condensation products, or any combination thereof and the like.

Polyphenols Suitable for Use in the Curable and Cured Compositions

Suitable polyphenols which can be employed to prepare the polymerizable mixtures of the present invention, include those containing one or more of the mesogenic moieties already described herein as well as any of the other known polyphenols which do not contain mesogenic moieties. Typical representatives of said polyphenols containing one or more mesogenic moieties include 4,4'-dihydroxystilbene, 4,4'-dihydroxybenzanilide, 4,4'-dihydroxybiphenyl, 4,4'-dihydroxydiphenylacetylene, 4,4'-dihydroxydiphenylazomethine, 4,4'-dihydroxyazobenzene, 4,4'-dihydroxyazoxybenzene, 4,4'-dihydroxy-alpha-methylstilbene, 4,4'-dihydroxy-alpha-cyanostilbene, 4,4'-dihydroxy-alpha-chlorastilbene and the like. Typical representatives of said polyphenols free of mesogenic moieties include resorcinol, 4,4'-sulfonyldiphenol, 4,4'-dihydroxydiphenyl oxide, tris(hydroxyphenyl)methane, phenol-formaldehyde condensation products, any combination thereof and the like.

Polymerizable Unsaturated Monomers Suitable for Use in the Curable and Cured Compositions Suitable compounds containing one or more polymerizable ethylenically unsaturated group(s) which can be employed to prepare the polymerizable mixtures of the present invention include both those containing one or more mesogenic moieties and those free of said moieties.

Suitable polymerizable ethylenically unsaturated monomers containing one or more mesogenic moieties are enumerated by Alexandre Blumstein in *Liquid Crystalline Order in Polymers*, published by Academic Press, New York (1978) on pages 105–140; *Mesomorphic Order in Polymers and Polymerization in Liquid Crystalline Media* published by American Chemical Society (ACS Symposium Series 74), Washington, D.C. (1978) on pages 56–70; and N. A. Plate and V. P. Shibaev in *Comb-Shaped Polymers and Liquid Crystals* published by Plenum Press, New York (1987) on pages 1–415; V. Percec, et. al., *Polymer Bulletin*, 17, pages 347–352 (1987); R. Duran and P. Gramain. *Makromol. Chem.*, 188, pages 2001–2009 (1987); A. M. Mousa, et. al., *Polymer Bulletin*, 6, pages 485–492 (1982); H. Finkelmann, et. al., *Makromol. Chem.*, 179, pages 829–832 (1978); M. Portugall, et. al., *Makromol. Chem.*, 183, pages 2311–2321 (1982) and U.S. Pat. Nos. 4,637,896 and 4,614,619, all of which are incorporated herein by reference. Suitable such polymerizable ethylenically unsaturated monomers containing one or more mesogenic moieties per molecule are represented by the Formulas XXXII or XXXIII:

   Formula XXXII

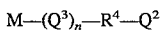   Formula XXXIII wherein n and $R^1$ are as hereinbefore defined, M is a group containing two or more aromatic rings bridged by a rigid central linkage, $R^4$ is a divalent hydrocarbon group having from one to about 12 carbon atoms and may be linear, branched, cyclic, aromatic or a combination thereof and may be substituted with one or more inert groups, such as, for example, a methoxy group, or may contain one or more inert heteroatom containing linkages, such as, for example, an ether linkage; $Q^3$ is —O—, —$NR^1$—, —S—, —O—CO—, —CO—O—, —$NR^1$—CO—, —CO—$NR^1$—, —CO—, —O—CO—O—, —S—CO—, —CO—S—, —$NR^1$—CO—O—, —O—CO—$NR^1$—, —$NR^1$—CO—$NR^1$—; and $Q^2$ is a polymerizable ethylenically unsaturated group. As a class, these monomers generally contain a —CH=$CH_2$, allyl, methallyl, propenyl, isopropenyl, acrylate or methacrylate group as the polymerizable ethylenically unsaturated group and a linear divalent aliphatic, aliphatic ether, aliphatic polyether, aliphatic thioether or cycloaliphatic flexible spacer connecting the polymerizable ethylenically unsaturated group and the mesogenic or rodlike group(s) through a heteroatom linkage. Typical mesogenic groups include those wherein two or more aromatic rings are bridged by a rigid central linkage wherein said rigid central linkage is required to bridge the aromatic rings to provide at least about 80 percent para substitution. The aromatic rings can be inertly substituted, however, unsubstituted aromatic rings which maximize the molecular aspect ratio are preferred. Also preferred is a single inert substituent in the para position on the ring not connected to the polymerizable ethylenically unsaturated group (either directly or via a flexible spacer). This type of substituent can be used to enhance the molecular aspect ratio. Typical of these inert substituents are $CH_3O$—, Cl—, $NO_2$—, —C≡N and the like. The aromatic rings can also contain one or more heteroatoms selected from N, O, S and the like. Typical rigid central linkage groups for bridging the aromatic rings include, for example, a direct bond, —$CR^1$=$CR^1$—, —C≡C—, —N=N—, —$CR^1$=N—, —$CR^1$=N—N=$CR^1$—, —$CR^1$=$CR^1$—CO—, —O—CO—, —$NR^1$—CO—, —CO—O—, —CO—$NR^1$—, —CO—$CR^1$=$CR^1$—, —$CR^1$=$CR^1$—O—CO—$(CH_2)_n$—, —N=$CR^1$—, —$(CH_2)_n$—CO—O—$CR^1$=$CR^1$—, —$CR^1$=$CR^1$—O—CO—, —CO—O—$CR^1$=$CR^1$—, —CO—O—N=$CR^1$—, —$CR^1$=N—O—CO—, —$CR^1$=$CR^1$—CO—O—, —CO—S—, —O—CO—$CR^1$=$CR^1$—, —$CR^1$=$CR^1$—CO—O—$(CH_2)_n$—, —S—CO—, —$(CH_2)_n$—O—CO—$CR^1$=$CR^1$—, —$CHR^1$—$CHR^1$—CO—O—, —O—CO—$CHR^1$—$CHR^1$—, —C≡C—C≡C—, —$CR^1$=$CR^1$—$CR^1$=$CR^1$—, —CO—$NR^1$—$NR^1$—CO—,

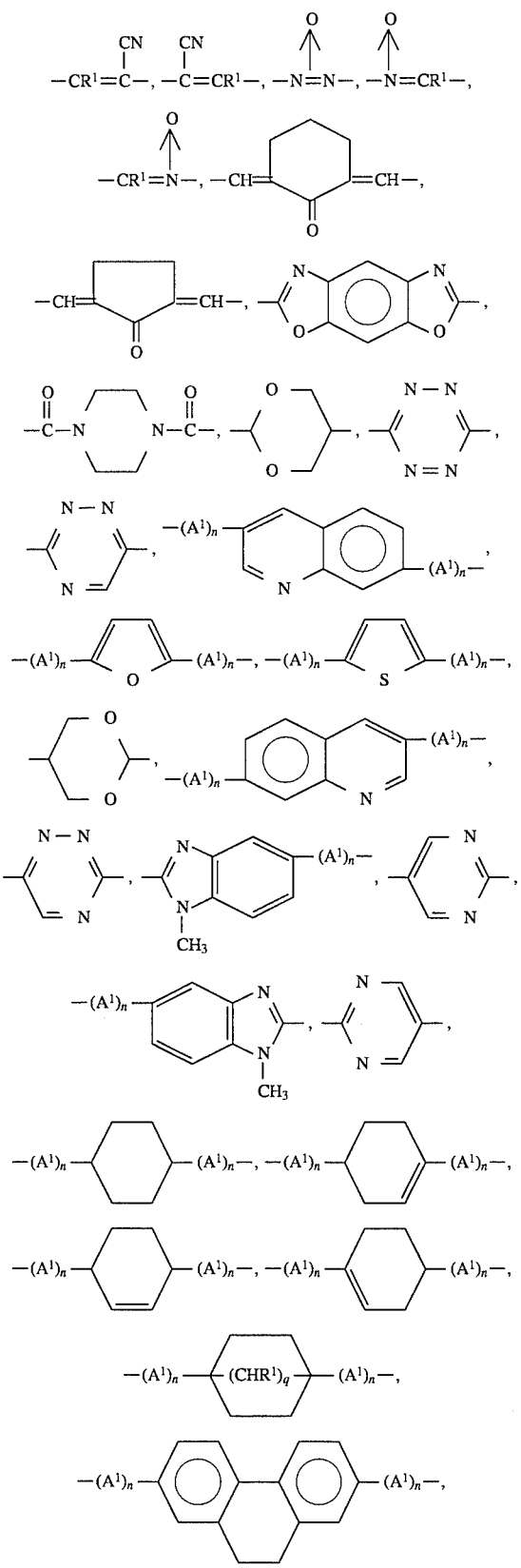

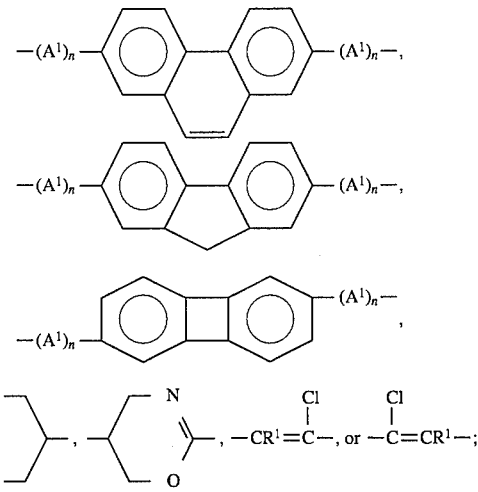

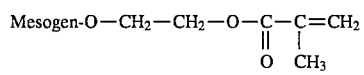

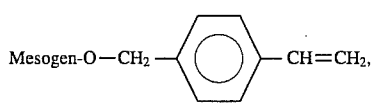

and the like; wherein $R^1$, $A^1$, n, n' and q are as hereinbefore defined. As is well known in the prior art, all or a part of the aromatic rings can be replaced with other promesogenic structures, such as, for example, the trans-cyclohexane ring or a cholesterol group. Additionally, it is has been demonstrated in the prior art that efficacious mesogen-containing polymerizable ethylenically unsaturated monomers can be prepared with omission of the flexible spacer between the polymerizable ethylenically unsaturated group and the mesogenic group(s).

Generally, the ethylenically unsaturated monomers containing —$CH=CH_2$, acrylate, allyl, methallyl, propenyl, isopropenyl or methacrylate as the polymerizable vinyl group and a linear divalent hydrocarbon group connecting the vinyl group and the mesogenic group through heteroatom containing functional groups between the hydrocarbon spacer and the mesogenic group are most preferred. Thus, a mesogenic group ether linked to a —$CH_2$—$CH_2$— which is in turn linked to provide a methacrylate ester, that is, $$\text{Mesogen-O-CH}_2\text{-CH}_2\text{-O-}\underset{\underset{O}{\|}}{C}\text{-}\underset{\underset{CH_3}{|}}{C}=CH_2$$

or a mesogenic group linked to a vinyl group, that is,

Mesogen-O—$CH_2$—⟨phenyl⟩—$CH=CH_2$, are examples of those species preferred as the ethylenically unsaturated monomer containing one or more mesogenic moieties.

Particularly suitable ethylenically unsaturated monomers containing a mesogenic moiety include, for example,

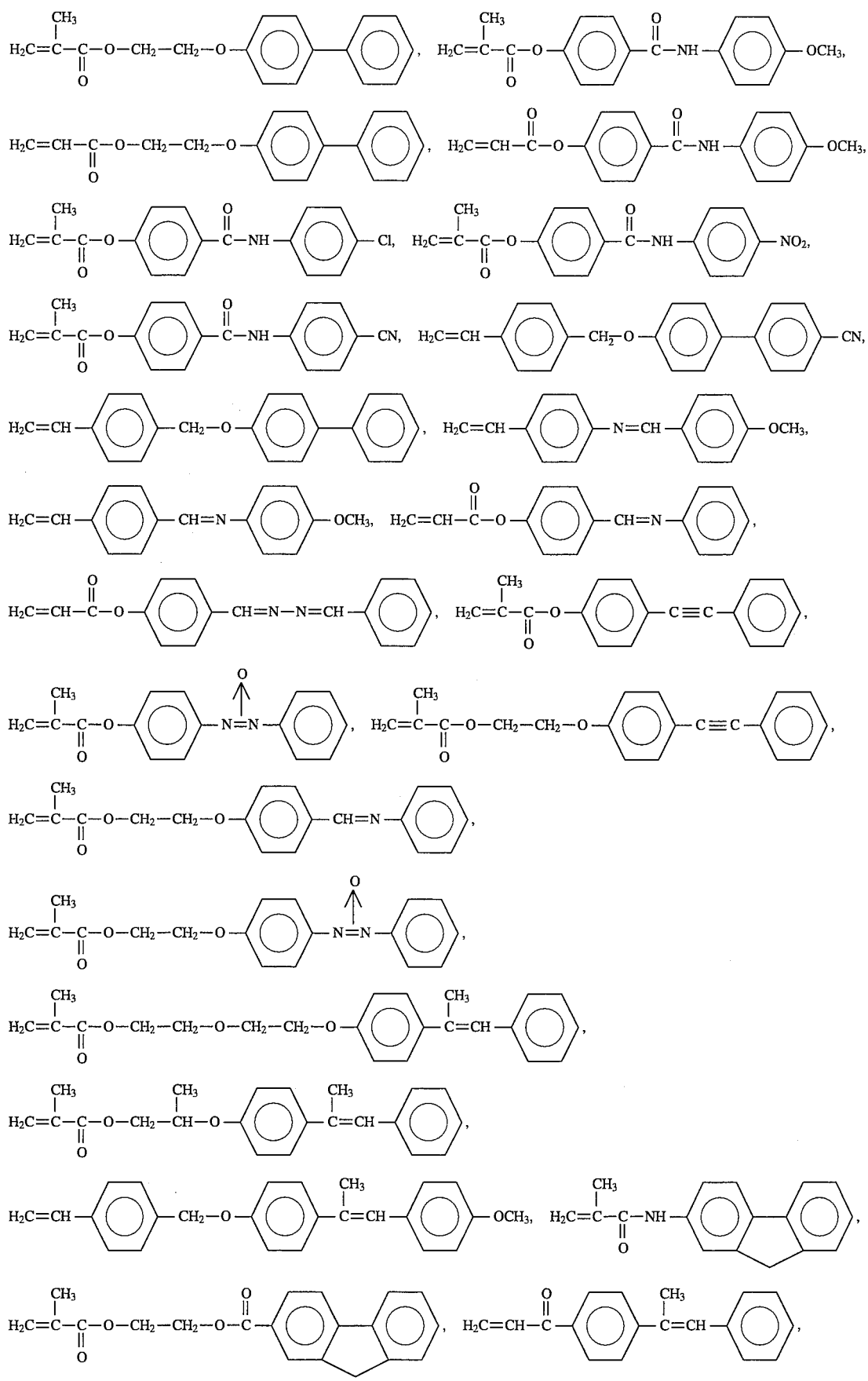

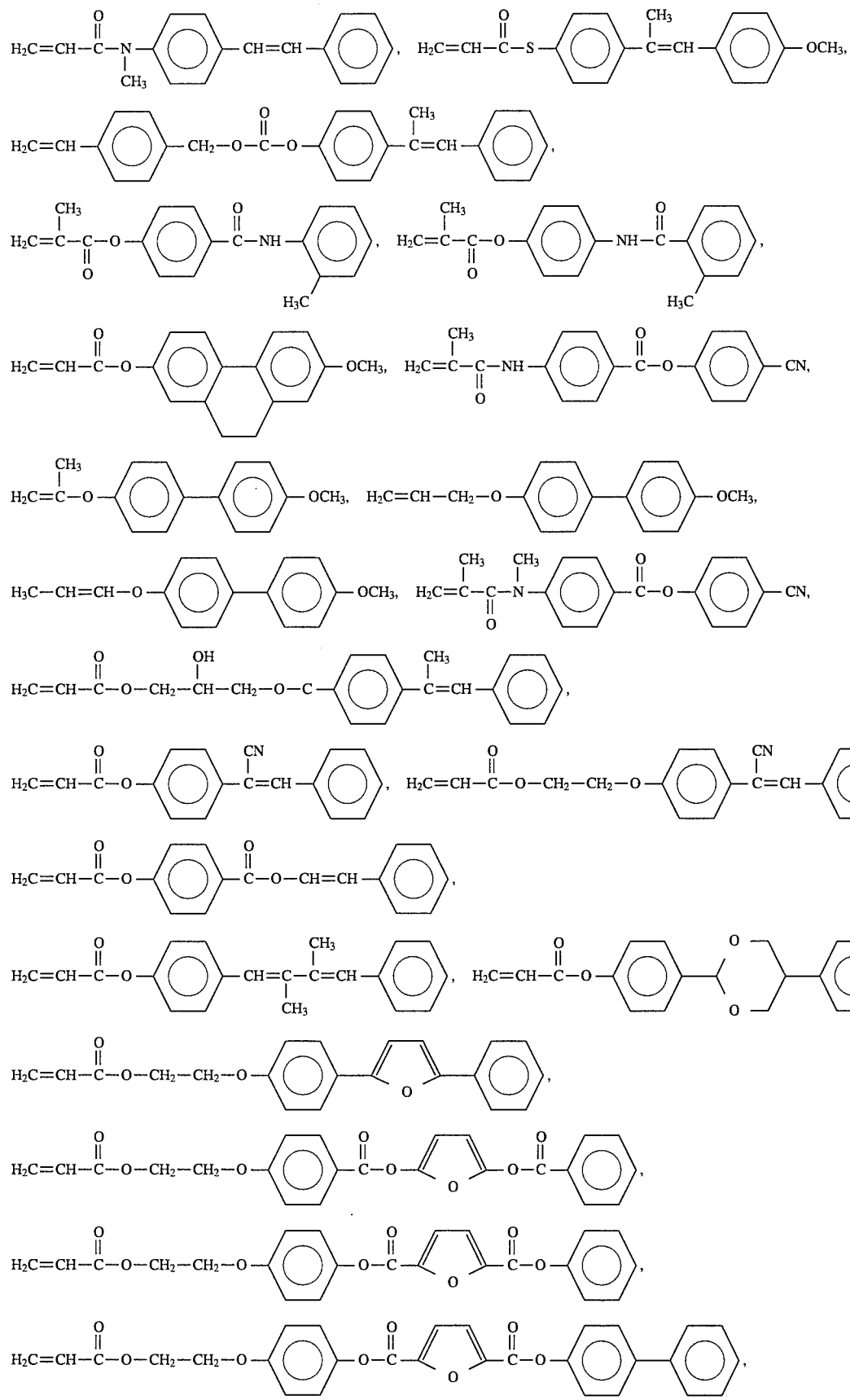

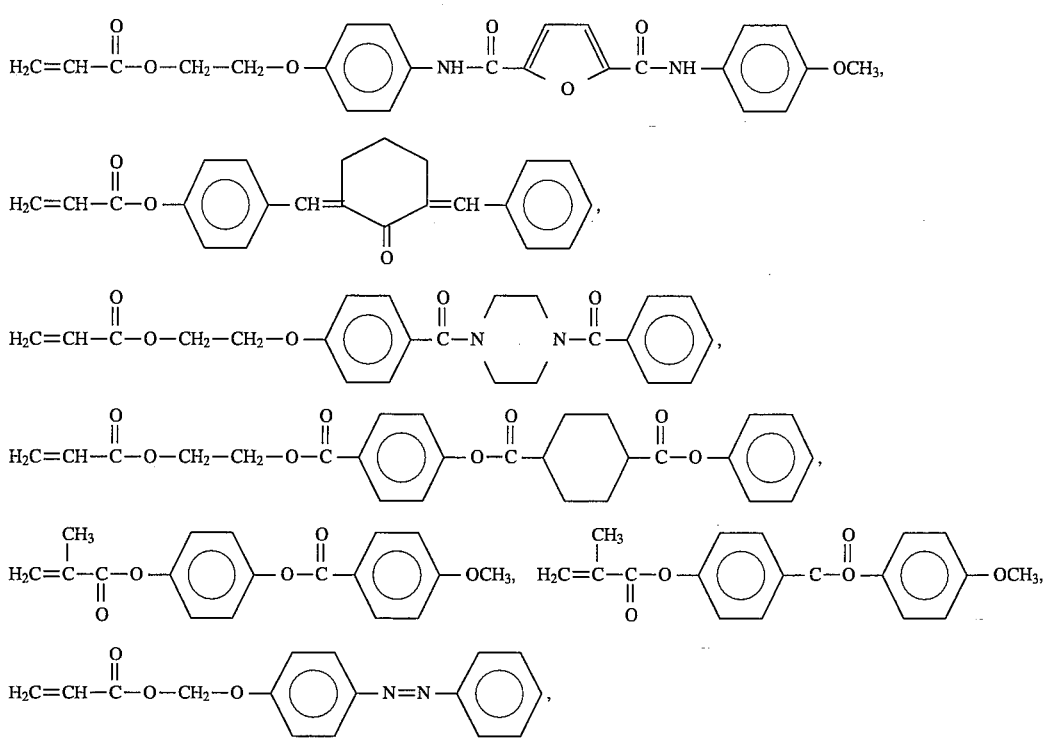

or any combination thereof and the like.

Suitable polymerizable ethylenically unsaturated monomers which do not contain mesogenic moieties can be selected from the many known classes of polymerizable vinyl monomers. Suitable such monomers include, for example, the vinyl aromatic compounds represented by the following Formula XXXIV

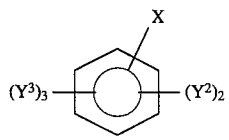   Formula XXXIV wherein each $R^1$ is as hereinbefore defined, $Y^2$ is independently hydrogen, a hydrocarbyl or hydrocarbyloxy group having from 1 to about 5 carbon atoms, a vinyl group, an allyl group, a methallyl group, a propenyl group, a isopropenyl group, a nitro group, a nitrile group, a halogen, such as chlorine or bromine or fluorine, or a —CO—$R^1$ group; each $Y^3$ is independently hydrogen, a hydrocarbyl or hydrocarbyloxy group having from 1 to about 5 carbon atoms, or a halogen, such as chlorine or bromine or fluorine and X is

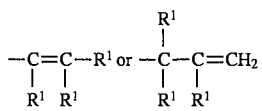

or the acrylate (methacrylate) compounds represented by the following Formula XXXV

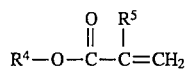   Formula XXXV wherein $R^4$ is a hydrocarbyl group having from 2 to about 25 carbon atoms and may be branched, cyclic, polycyclic, saturated or unsaturated and $R^5$ is hydrogen or a methyl group.

Typical polymerizable unsaturated monomers represented by Formula XXXIV include, for example, styrene, alpha-methylstyrene, o-, m-, p-chlorostyrene; o-, m-, p-bromostyrene; o-, m-, p-tert-butylstyrene; m-, p-methylstyrene; o-, m-, p-methoxystyrene; divinylbenzenes, trivinylbenzenes, o-, m-, pisopropenylstyrene; o-, m-, p-allylstyrene; o-, m-, p-methallylstyrene; allylbenzene, methallylbenzene, diallylbenzenes, or any combination thereof and the like.

Typical acrylate (methacrylate) esters represented by Formula XXXV include, for example, ethyl acrylate, n-butyl acrylate, n-butyl methacrylate, sec-butyl acrylate, 2-ethylhexyl acrylate, 2-ethylhexyl methacrylate, n-dodecyl acrylate, cyclohexyl acrylate, methylcyclohexyl acrylate, norbornyl acrylate, dicyclopentadiene acrylate, methyldicyclopentadiene acrylate, or any combination thereof and the like.

Other suitable monomers include the acidic monomers, such as acrylic and methacrylic acid; the amide monomers, such as acrylamide and N-methylacrylamide; the allyl monomers, such as diallylphthalate, triallylisocyanurate, diallylmaleate and dimethallylfumarate; the vinyl halides, such as vinyl chloride and vinyl bromide; the vinyl esters, such as vinyl acetate; the vinyl di and polycyclic aromatics, such as vinyl naphthalene; the vinyl nitriles, such as acrylonitrile; and the hydroxyalkyl acrylates and methacrylates, such as 2-hydroxyethyl acrylate, or any combination thereof.

Compounds Containing Both a Cyanate or Cynanamide Group and a Polymerizable Ethylenically Unsaturated Group for Use in the Curable and Cured Compositions Suitable compounds which contain both a cyanate or cyanamide group and a polymerizable ethylenically unsaturated group in the same molecule that can be used to prepare the polymerizable mixtures of the present invention include, for example, those represented by the Following Formula XXXVI

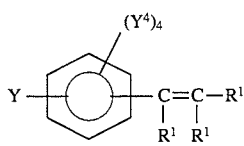

Formula XXXVI wherein each Y and R¹ are as hereinbefore defined, Y⁴ is independently hydrogen, a hydrocarbyl or hydrocarbyloxy group having from 1 to about 12 carbon atoms, a nitro group, a nitrile group, a halogen, such as chlorine or bromine or fluorine, or a —CO—R¹ group; or a compound represented by the following Formula XXXVII

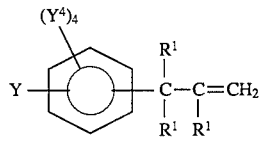

Formula XXXVII wherein each Y, Y⁴ and R¹ are as hereinbefore defined.

Suitable compounds which contain a cyanate or cyanamide group and a polymerizable ethylenically unsaturated group in the same molecule represented by Formulas XXXVI and XXXVII include, for example, o-, m-, p-isopropenylphenyl cyanate; o-, m-, p-vinylphenyl cyanate; methyl-p-isopropenylphenyl cyanates; 3-chloro-4-isopropenylphenyl cyanate; o-, m-, p-propenylphenyl cyanate; o-, m-, p-allylphenyl cyanate; o-, m-, p-methallylphenyl cyanate and the like. Some of the alkenylphenol precursors to the alkenylphenyl cyanates represented by Formula XXXVI, notably the vinylphenols, have a tendency to dimerize or oligomerize thus leading to poly(alkenylphenyl)cyanates. It is most preferred that the alkenylphenyl cyanate be substantially free of dimeric and/or oligomeric components, although it is operable to use an alkenylphenyl cyanate containing substantial (up to 90 percent by weight) dimeric and/or oligomeric components. A specific preparation of p-isopropenylphenyl cyanate is taught in Example 1 of U.S. Pat. No. 4,559,399 which is incorporated herein by reference.

Compounds Containing Both a 1,2-Epoxide Group and a Polymerizable Ethylenically Unsaturated Group for Use in the Curable and Cured Compositions Suitable compounds which contain both a 1,2-epoxide group and a polymerizable ethylenically unsaturated group in the same molecule that can be used to prepare the polymerizable mixtures of the present invention include, for example, those represented by the following Formulas XXXVIII or XXXIX

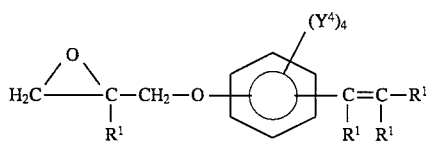

Formula XXXVIII

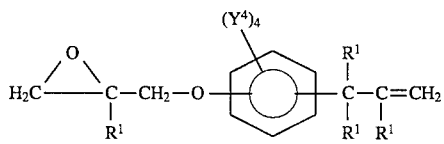

Formula XXXIX wherein each Y⁴ and R¹ are as hereinbefore defined.

Suitable compounds which contain a 1,2-epoxide group and a polymerizable ethylenically unsaturated group in the same molecule represented by Formulas XXXVIII and XXXIX include, for example, o-, m-, p-isopropenylphenyl glycidyl ether; o-, m-, p-vinylphenyl glycidyl ether; methyl-p-isopropenylphenyl glycidyl ethers; 3-chloro-4-isopropenylphenyl glycidyl ether: o-, m-, p-propenylphenyl glycidyl ether; o-, m-, p-allylphenyl glycidyl ether; o-, m-, p-methallylphenyl glycidyl ether, or any combination thereof and the like. Some of the alkenylphenol precursors to the alkenylphenyl glycidyl ethers represented by Formula XXXVIII, notably the vinylphenols, have a tendency to dimerize or oligomerize thus leading to poly(alkenylphenyl)glycidyl ethers. It is most preferred that the alkenylphenyl glycidyl ether be substantially free of dimeric and/or oligomeric components, although it is operable to use an alkenylphenyl glycidyl ether containing substantial (up to 90 percent by weight) dimeric and/or oligomeric components. The compounds which contain a 1,2-epoxide group and a polymerizable ethylenically unsaturated group in the same molecule are prepared using the corresponding phenol containing a polymerizable ethylenically unsaturated group and the hereinbefore described chemistry used in the preparation of epoxy resins.

Compounds Containing Both a Maleimide Group and a Cyanate Group Suitable for Use in the Curable and Cured Compositions Suitable compounds which contain both a maleimide group and a cyanate group in the same molecule that can be used to prepare the polymerizable mixtures of the present invention include, for example, those represented by the following Formulas XXXX, XXXXI or XXXXII

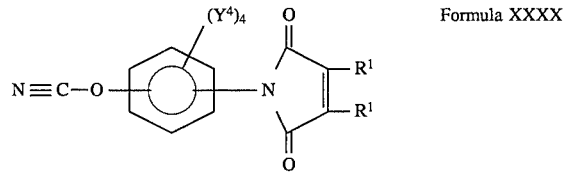

Formula XXXX

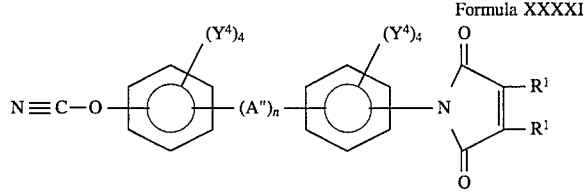

Formula XXXXI

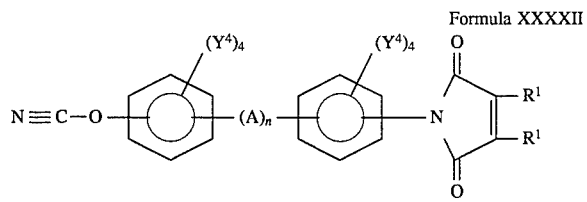

Formula XXXXII wherein each Y⁴, R¹, A, A" and n are as hereinbefore defined.

Suitable compounds which contain a maleimide group and a cyanate group in the same molecule represented by Formulas XXXX, XXXXI and XXXXII include, for example, 4-(1-(3-(2,5-dihydro-2,5-dioxo-1H-pyrrol-1-yl)phenyl)-1-methylethyl)phenyl cyanate; 4-(1-(4-(2,5-dihydro-2,5-dioxo-1H-pyrrol-1-yl)phenyl)-1-methylethyl)phenyl cyanate; 4 -(1-(4-(2,5-dihydro-2,5-dioxo-1H-pyrrol-1-yl)phenyl)ethyl)phenyl cyanate; 4-(4-(2,5-dihydro-2,5-dioxo-1H-pyrrol-1-yl)phenoxy)phenyl cyanate; 4-((4-(2,5-dihydro-2,5-dioxo-1H-pyrrol-1-yl)phenyl)thio)phenyl cyanate; 4-(4-(2,5-dihydro-2,5-dioxo-1H-pyrrol-1-yl)benzoyl)phenyl cyanate; 4-((4-(2,5-dihydro-2,5-dioxo-1H-pyrrol-1-yl)phenyl)sulfonyl)phenyl cyanate; 4-(1-(4-(2,5-dihydro-3-methyl-2,5-dioxo-1H-pyrrol-1-yl)phenyl)-1-methylethyl)phenyl cyanate; 2,6-dibromo-4-(1-(3,5-dibromo-4-(2,5-dihydro-2,5-dioxo-1H-pyrrol-1-yl)phenyl)-

1-methylethyl)phenylcyanate; 4-(2,5-dihydro-2,5-dioxo-1H-pyrrol-1-yl)phenyl cyanate; 3-(2,5-dihydro-2,5-dioxo-1H-pyrrol-1-yl)phenyl cyanate and the like. Preparation of compounds which contain a maleimide group and a cyanate group in the same molecule is taught in U.S. Pat. No. 4,683,276 which is incorporated herein by reference.

Compounds Containing One Cyanate or Cyanamide Group Per Molecule and One or More Mesogenic Moieties Which Can Be Employed in the Curable and Curable Compositions Suitable compounds which contain one or more mesogenic moieties and an average of one cyanate or cyanamide group per molecule that can be used to prepare the polymerizable mixtures of the present invention include, for example, those represented by the following Formulas XXXXIII, XXXXIV, XXXXV, or XXXXVI

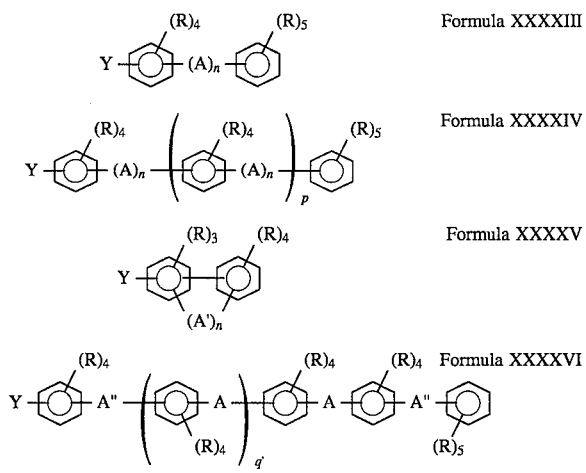

wherein at least 80 percent of the —A— linkages, the direct bond in Formula XXXXV and the Y groups are in the para position with respect to each other and each A, A', A", R, Y, n, p and q' are as hereinbefore defined.

Suitable compounds which contain one or more mesogenic moieties and an average of one cyanate or cyanamide group per molecule represented by Formulas XXXXIII, XXXXIV, XXXXV and XXXXVI include, for example, the cyanates of 4-hydroxystilbene, 4-hydroxy-4'-methoxystilbene, 4-hydroxy-4'-chlorostilbene, 4-hydroxy-4'-nitrostilbene, 4-hydroxy-4'-cyanostilbene, 4-hydroxyalpha-methylstilbene, 4-hydroxychalcone, 1-(4-hydroxyphenyl)-2-phenylacetylene, 1-(4-hydroxyphenyl)-2-phenylazomethine, 4-hydroxyphenylazobenzene, 4-hydroxyphenylazoxybenzene, 4-(4-hydroxyphenoxy)diphenyl, 4-hydroxydiphenyl, 4-hydroxy-alpha-cyanostilbene, 4-hydroxy-alpha-ethylstilbene, 4-hydroxybenzanilide, 4-hydroxy-4'-methoxybenzanilide, 4-hydroxy-3,3',5,5'-tetramethyl-alpha-methylstilbene, N-methyl-4-hydroxybenzamide, N-phenyl-4-hydroxybenzamide, 4-hydroxy-3,3',5,5'-tetrabromo-alpha-methylstilbene, 4-hydroxyphenylbenzoate, phenyl-4-hydroxybenzoate, the cyanamides of 4-aminostilbene, 4-amino-alpha-methylstilbene, 4-aminobenzanilide, or any combination thereof and the like. The compounds which contain one or more mesogenic moieties and an average of one cyanate or cyanamide group per molecule are prepared using the corresponding monophenol (monoamine) containing one or more mesogenic moieties and the hereinbefore described chemistry used in the preparation of polycyanates (polycyanamides).

Method for Forming the Mixtures of the Present Invention

The mixtures of the present invention can be prepared by directly combining one or more of the desired component(s) with one or more polycyanates containing one or more mesogenic moieties as lateral substituents or by addition of one or more of the desired components to the polycyanates containing one or more mesogenic moieties as lateral substituents in increments or stages. When a single component is to be added to the polycyanates containing one or more mesogenic moieties as lateral substituents, said component may be prepolymerized (B-staged) or fully homopolymerized, prior to the addition. Additionally, certain of said single components may be homopolymerized (interpolymerized) while dispersed in or mixed in with one or more polycyanates containing one or more mesogenic moieties as lateral substituents. When two or more components are to be added to the polycyanates containing one or more mesogenic moieties as lateral substituents, said components may be partially or totally copolymerized or reacted together, prior to the addition. Additionally, when two or more components are to be added to the polycyanates containing one or more mesogenic moieties as lateral substituents, one component may be prepolymerized or fully homopolymerized in the presence of the other components, prior to the addition. It is understood that one or more catalysts or accelerators may be included where desired to facilitate the aforementioned copolymerization, interpolymerization, prepolymerization, homopolymerization or reaction of one or more specific components.

The mixtures of the thermosettable polycyanate containing one or more mesogenic moieties as lateral substituents (component A) and the components B-1 to B-12 can contain any amounts of components A and B. Suitably, the components are employed in amounts such that the mixture contains from about 1 to about 99, preferably from about 25 to about 95, more preferably from about 50 to about 90 percent by weight of component A based on the combined weight of components A and B; and from about 99 to about 1, preferably from about 75 to about 5, more preferably from about 50 to about percent by weight based on the combined weight of components A and B.

Polymerization of the Polymerizable Mixtures

The mixtures of the present invention may be polymerized by heating from about 50° C. to about 400° C., preferably by heating from 100° C. to 250° C., optionally in the presence of one or more suitable catalysts. In addition to the catalysts previously delineated for the polymerization of polycyanates (or polycyanamides), whenever one or more polymaleimides, compounds containing one or more polymerizable ethylenically unsaturated group(s), compounds which simultaneously contain both a cyanate or cyanamide group and a polymerizable ethylenically unsaturated group, compounds which simultaneously contain both a 1,2-epoxide group and a polymerizable ethylenically unsaturated group or compounds which simultaneously contain both a maleimide group and a cyanate group it is often desireable to utilize one or more free radical forming catalysts for the purpose of polymerizing all or a part of said unsaturated groups. Said free radical forming catalysts include the organic peroxides and hydroperoxides as well as the azo and diazo compounds. Preferred free radical forming catalysts include benzoylperoxides, t-butylhydroperoxide, t-butylperoxybenzoate, azobisisobutyronitriles dicumylperoxide, di-tert-butylperoxide and cumene hydroperoxide. The quantity of catalyst used, if any, depends on the structure of the particular catalyst, the structure of the components used in the polymerizable mixture, the cure structure desired, the cure times the cure temperature, and the like. Generally, catalyst concentrations of from about 0.001 to about 2 percent by weight are preferred. B-staging or prepolymerization of the mixtures of the present invention can be accomplished by using lower temperatures and/or shorter curing times. Curing of the thus formed B-staged (prepolymerized) mixture can then be accomplished at a later time or immediately following B-staging (prepolymerization) by increasing the temperature and/or curing time.

The polymerized mixtures possess a variety of curing structures which depends in part, upon the amounts and types of individual components used to prepare said mixture, the sequence of component addition and procedure used to prepare said mixture, the amounts and types of catalysts, if any, employed, the reaction times and temperatures, and the like.

Mixtures of (A) one or more polycyanates containing one or more mesogenic moieties as lateral substituents and no other moieties reactive with the cyanate group with (B-1) one or more polycyanates containing one or more mesogenic moieties in the main chain of the molecule or one or more polycyanates which do not contain mesogenic moieties and/or prepolymers of either of the aforementioned types of polycyanates cure via cyclotrimerization of the cyanate moieties to provide the polytriazine thermoset. As a preferred embodiment of the present invention, addition of about 10 percent or more of a polycyanate containing one or more mesogenic moieties as lateral substituents to a polycyanate which does not contain mesogenic moieties followed by polymerizing or curing provides a polytriazine with improved properties over those of the polytriazine obtained from curing or polymerizing of only the polycyanate which does not contain mesogenic moieties. An additional preferred embodiment of the present invention, involves addition of about 10 percent or more of a polycyanate containing one or more mesogenic moieties as lateral substituents to a polycyanate containing one or more mesogenic moieties in the main chain of the molecule.

Mixtures of (A) one or more polycyanates containing one or more mesogenic moieties as lateral substituents and no other moieties reactive with the cyanate group with (B-2) one or more epoxy resins using a 1 to 1 mole ratio of cyanate groups to epoxide groups polymerize to produce a complex structure. Increasing the mole ratio of cyanate to epoxide groups can be done to increase the relative amount of triazine groups in the cured product. A preferred embodiment of the present invention is the polymerization product of a polycyanate containing one or more mesogenic moieties as lateral substituents with an epoxy resin containing one or more mesogenic moieties. The aforementioned polymerized product provides improved properties relative to the polymerization product of a polycyanate which does not contain mesogenic moieties with an epoxy resin which does not contain mesogenic moieties.

Mixtures of (A) one or more polycyanates containing one or more mesogenic moieties as lateral substituents and no other moieties reactive with the cyanate group with (B-3) one or more polymaleimides can polymerize to produce a complex variety of structures including the triazine group resulting from cyclotrimerization of cyanate moieties

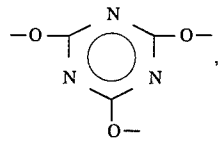

the maleimide group homopolymerization structure,

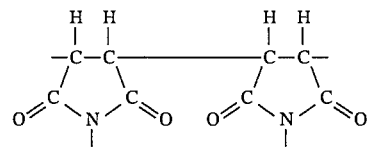

and cyanate group and maleimide group copolymerization structures such as, for example,

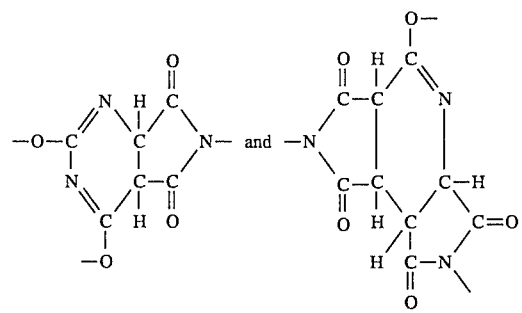

Changes in the mole ratio of cyanate groups and maleimide groups can be made to influence the composition of the cured product. Increasing the mole ratio of cyanate groups to maleimide groups to above 1 to 1 can be done to increase the relative amount of triazine groups in the polymerized product. A decrease in the mole ratio of cyanate groups to maleimide groups to below 1 to 1 favors an increase in the amount of maleimide group homopolymerization structure in the cured product. A preferred embodiment of the present invention is the polymerization product of a polycyanate containing one or more mesogenic moieties as lateral substituents with a polymaleimide containing one or more mesogenic moieties. The aforementioned polymerized product provides improved properties relative to the polymerization product of a polycyanate which does not contain mesogenic moieties with a polymaleimide which does not contain mesogenic moieties. Methods for the copolymerization of polycyanates which do not contain mesogenic moieties with polymaleimides are taught by U.S. Pat. Nos. 4,469,859; 4,404,330; 4,396,745; 4,383,903; 4,373,086; 4,371,689; 4,369,304; 4,287,014 and 4,110,364 which are incorporated herein by reference.

Mixtures of (A) one or more polycyanates containing one or more mesogenic moieties as lateral substituents and no other moieties reactive with the cyanate group with (B-4) one or more polyamines using a 1 to 1 mole ratio of cyanate groups to amine groups polymerize to produce poly(iminocarbamic acid esters). Increasing the mole ratio of cyanate to amine groups can be done to induce formation of triazine groups in the polymerized or cured product. Methods for the reaction of polyamino compounds with polycyanate compounds to produce poly(iminocarbamic acid esters) are taught by U.S. Pat. No. 3,502,617 which is incorporated herein by reference.

Mixtures of (A) one or more polycyanates containing one or more mesogenic moieties as lateral substituents and no other moieties reactive with the cyanate group with (B-5) one or more polyphenols using a 1 to 1 mole ratio of cyanate groups to amine groups polymerize to produce poly(iminocarbonic esters). Increasing the mole ratio of cyanate to phenolic hydroxyl groups can be done to induce formation of triazine groups in the polymerized or cured product. Methods for the reaction of polyphenol compounds with polycyanate compounds to produce poly(iminocarbonic acid esters) are taught by U.S. Pat. No. 3,491,060 which is incorporated herein by reference.

Mixtures of (A) one or more polycyanates containing one or more mesogenic moieties as lateral substituents and no other moieties reactive with the cyanate group with (B-6) one or more polymerizable ethylenically unsaturated compounds can polymerize to produce a complex variety of structures including the triazine group resulting from cyclotrimerization of cyanate moieties, structure from the polymerization of the polymerizable ethylenically unsaturated compound(s) and cyanate group and polymerizable ethylenically unsaturated group copolymerization structures. A specific example of a structure arising from the copolymerization of cyanate groups with a vinyl aromatic group (styrene) is as follows:

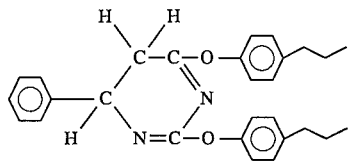

Changes in the mole ratio of cyanate groups and polymerizable ethylenically unsaturated groups can be made to influence the composition of the polymerized product. Increasing the mole ratio of cyanate groups to polymerizable ethylenically unsaturated groups to above 1 to 1 can be done to increase the relative amount of triazine groups in the polymerized product. A decrease in the mole ratio of cyanate groups to polymerizable ethylenically unsaturated groups to below 1 to 1 favors an increase in the amount of polymerizable ethylenically unsaturated group homopolymerization structure in the polymerized product. A preferred embodiment of the present invention is the polymerization product of a polycyanate containing one or more mesogenic moieties as lateral substituents with a polymerizable ethylenically unsaturated compound containing one or more mesogenic moieties. The aforementioned polymerized product provides improved mechanical properties relative to the polymerization product of a polycyanate which does not contain one or more mesogenic moieties as lateral substituents with a polymerizable ethylenically unsaturated compound which does not contain mesogenic moieties. Methods for the copolymerization of a specific class of polycyanates which do not contain mesogenic moieties with vinyl aromatic monomers are taught in U.S. Pat. No. 4,746,727 which is incorporated herein by reference.

Mixtures of (A) one or more polycyanates containing one or more mesogenic moieties as lateral substituents and no other moieties reactive with the cyanate group with (B-7) one or more compounds which simultaneously contain both a cyanate group and a polymerizable ethylenically unsaturated group or (B-8) one or more compounds which simultaneously contain both a 1,2-epoxide group and a polymerizable ethylenically unsaturated group or (B-9) one or more compounds which simultaneously contain both a maleimide group and a cyanate group can polymerize to produce a complex variety of structures, including those previously mentioned for the various respective functional groups. As a specific example, a preferred mixture of the present invention consists of the polymerization product of (B-7) one or more compounds which simultaneously contain both a cyanate group and a polymerizable ethylenically unsaturated group with (B-6) one or more compounds containing one or more ethylenically unsaturated groups. This copolymer is either prepared in situ by free radical initiated polymerization of the (B-6) and (B-7) components in a molten or solvent solution of (A) one or more polycyanates containing one or more mesogenic moieties as lateral substituents or it may be prepared separately then added to component (A). The resultant mixture is a polymer modified polycyanate containing one or more mesogenic moieties as lateral substituents which can be homopolymerized to provide the corresponding polymer modified polytriazine. In a further preferred embodiment of the present invention, if component (B-6) consists of one or more compounds containing ethylenically unsaturated groups and one or more mesogenic moieties, liquid crystal polymer modified polycyanates containing one or more mesogenic moieties as lateral substituents and polytriazines thereof can be produced via the aforementioned technique. Preparation of polymer modified cyanates which do not contain mesogenic moieties is taught by U.S. Pat. No. 4,559,399 which is incorporated herein by reference.

Mixtures of (A) one or more polycyanates containing one or more mesogenic moieties as lateral substituents with (B-10) one or more compounds which contain one or more mesogenic moieties per molecule and only one cyanate (cyanamide) group per molecule can be cured via cyclotrimerization of the cyanate moieties to provide the polytriazine thermoset, providing that no other moieties reactive with cyanate groups are present in (A) or (B-10). Increasing the amount of the aforementioned cyanate compound containing an average of one cyanate group per molecule with respect to the amount of polycyanate can be used as a convenient method for lowering the crosslink density of the polytriazine product thereof.

Orientation of the Polymerized Product Containing Mesogenic Molecules

During processing and/or curing of the polycyanates containing one or more mesogenic moieties as lateral substituents or the mixtures containing said polycyanates, electric or magnetic fields or shear stresses can be applied for the purpose of orienting the mesogenic moieties contained or developed therein. As specific examples of these methods, Finkelmann, et. al., *Macromol. Chem.*, 180, 803–806 (March, 1979), incorporated herein by reference, induced orientation in an electric field, of thermotropic methacrylate copolymers containing mesogenic side chain groups decoupled from the main chain via flexible spacers. Orientation in a magnetic field of mesogenic side chain groups decoupled from the main chain via flexible spacers has been demonstrated by Roth and Kruecke, *Macromol. Chem.*, 187, 2655–2662 (November, 1986) which is incorporated herein by reference. Magnetic field induced orientation of mesogenic main chain containing polymers has been demonstrated by Moore, et. al., *ACS Polymeric Material Sciences and Engineering*, 52, 84–86 (April–May, 1985) which is incorporated herein by reference. Magnetic and electric field induced orientation of low molecular weight mesogenic compounds is discussed by W. Krigbaum in *Polymer Liquid Crystals*, pages 275–309 (1982), published by Academic Press, Inc., and is incorporated herein by reference. The use of shear to induce orientation is also discussed therein. When the curing is to be performed in an electric or magnetic field, it is frequently of value to conduct simple preliminary experiments that allow for balancing of cure kinetics versus induction of orientation under the particular experimental conditions being employed (i.e. catalyst(s) level being used, temperature used, inherent dielectric (diamagnetic) susceptibility of the specific mesogenic structure(s) used, etc.). This is done recognizing the relatively greater ease of inducing orientation in low molecular weight materials versus polymeric materials containing mesogenic moieties.

In addition to orientation by electric or magnetic fields, the polycyanates containing one or more mesogenic moieties as lateral substituents or mixtures containing said polycyanates can be oriented by shear forces which are induced by flow through dies, orifices and mold gates. A general discussion of orientation of thermotropic liquid crystalline polymers by this method is given by S. K. Garg and S. Kenig in *High Modulus Polymers,* pages 71–103 (1988) published by Marcel Dekker, Inc. which is incorporated herein by reference. For the mesomorphic polycyanates or mixtures containing said polycyanates, this shear orientation can conveniently be produced by or during processing methods such as injection molding, extrusion, pultrusion, filament winding, filming and prepreging.

Other Components Which Can Be Employed

The polycyanates containing one or more mesogenic moieties as lateral substituents or mixtures containing said polycyanates can be blended with other materials such as solvents or diluents, fillers including those comprising a liquid crystalline polymer, pigments, dyes, flow modifiers, thickeners, reinforcing agents, mold release agents, wetting agents, stabilizers, fire retardant agents, surfactants, low profile additives, shrinkage control agents, other resinous products, combinations thereof and the like.

These additives are added in functionally equivalent amounts, e.g., the pigments and/or dyes are added in quantities which will provide the composition with the desired color, however, they are suitably employed in amounts of from about zero to about 20, more suitably from about 0.5 to about 5, most suitable from about 0.5 to about 3 percent by weight based on the total weight of the composition.

Solvents or diluents which can be employed herein include, for example, hydrocarbons, ketones, aliphatic ethers, cyclic ethers, esters, chlorinated hydrocarbons, combinations thereof and the like. Particularly suitable solvents or diluent, include, for example, toluene, xylenes, methylethyl ketone, methylisobutyl ketone, methylamyl ketone, chloroform, acetone, perchloroethylene, methylene chloride, tetrahydrofuran, 1,4-dioxane, ethyl acetate, butyl acetate, combinations thereof and the like.

The modifiers such as thickeners, flow modifiers, shrinkage control agents, low profile additives and the like can be suitably employed in amounts from about 0.05 to about 15, more suitably from about 0.1 to about 10, most suitably from about 0.1 to about 5 percent by weight based on the total weight of the composition.

Reinforcing materials which can be employed herein include natural and synthetic fibers in the form of woven fabric, mats, monofilament, multifilament, unidirectional fibers, rovings, random fibers or filaments, inorganic fillers or whiskers, hollow spheres, and the like. Suitable reinforcing materials include glass, ceramics, nylon, rayon, cottons aramid, graphite, polyalkylene terephthlates, polyethylene, polypropylene, polyesters, carbon, boron, asbestos, combinations and hybrids thereof and the like.

Suitable fillers which can be employed herein include, for example, inorganic oxides, ceramic microspheres, plastic microspheres, glass microspheres, inorganic whiskers, calcium carbonate, graphite powder, sand, metal powders, combinations thereof and the like. The fillers can be employed in amounts from about 0.1 to about 95, more suitably from about 5 to about 80, most suitably from about 10 to about 50 percent by weight of the total composition.

Uses for the Compositions

The compositions of the present invention can be employed in the preparation of laminates, prepregs, composites, coatings, castings, pultruded products, filament wound products, films, molding and potting formulations, injection molded products, and the like.

The following examples are illustrative of the invention but are not to be construed as to limiting the scope thereof in any manner.

EXAMPLE 1

A. Synthesis of p-2-Hydroxyethylether of Biphenyl p-Phenylphenol (170.21 grams, 1.00 mole), ethylene carbonate (96.87 grams, 1.10 moles) and 4-(N,N-dimethylamino)pyridine (0.10% wt. of total reactants, 0.267 grams) are added to a 1 liter glass resin kettle reactor equipped with a nitrogen inlet, a thermometer with temperature sensor and controller for a pair of external heating lamps, a paddle type mechanical stirrer and a chilled water condenser. Heating commenced concurrent with stirring and once a temperature of 80° C. is achieved triethylamine (1.0% wt. of total reactants, 2.67 grams) was added to the reactor. Heating continues until a reaction temperature of 135° C. is achieved and this temperature is then maintained for the next one hour. At the end of the one hour period thin layer chromatography of a portion of the product on a silica gel plate using a 4/1 volume mixture of hexane/ethyl acetate as the eluent followed by visualization via treatment of the plate with 5% phosphomolybdic acid in ethanol then heat, versus a p-phenylphenol standard ($R_f$=0.80) demonstrates that total conversion of the reactants to a single product ($R_f$=0.19) has occurred. The product is poured into cold toluene (325 milliliters) then heated to reflux to put all precipitated crystalline product into solution. The solution is maintained at 4° C. for 12 hours then the recrystallized product removed via filtration. After washing in the filter with cold toluene (50 milliliters), the product is recovered and dried in a vacuum oven at 90° C. and 5 mm Hg. A constant weight of product-is recovered (193.1 grams) as transparent crystalline plates. Proton magnetic resonance spectroscopy confirms the product structure for the p-2hydroxyethylether of biphenyl.

B. Esterification of 4,4'-bis(4-Hydroxyphenyl)valeric acid with p-2-Hydroxyethylether of biphenyl 4,4'-bis(4-hydroxyphenyl)valeric acid (114.53 grams, 0.40 mole), p-2-hydroxyethylether of biphenyl from A above (85.70 grams, 0.40 mole), xylene (1000 milliliters) and p-toluenesulfonic acid (2.98 grams, 2.6% wt. of 4,4'-bis(4-hydroxyphenyl)valeric acid used) are added to a 2 liter glass resin kettle reactor outfitted with a nitrogen inlet, a thermometer with temperature sensor and controller for a pair of external heating lamps, a paddle type mechanical stirrer and a Dean Stark trap—chilled water condenser assembly. Heating commences concurrent with stirring under a nitrogen atmosphere (2.0 liters per minute). Once a temperature of 130° C. is achieved, the first drop of distillate is collected into the Dean Stark trap. After an additional 38 minutes, the reaction temperature reaches 142° C., the slurry becomes a clear purple colored solution and a cumulative total of 55.5 milliliters of distillate is collected through the Dean Stark trap and discarded, with 6 milliliters of this distillate being a clear bottom layer of water. After an additional 33 minutes, the reaction temperature reaches 144° C. and a cumulative total of 158.5 milliliters of distillate is collected through the Dean Stark trap and discarded, with 9 milliliters of this distillate being a clear bottom layer of water. At this time the overhead distillate is free of cloudiness, thus the xylene was allowed to fill the Dean Stark trap and recycle back to the reactor for the duration of the reaction. After an additional 264 minutes of reaction, the reaction temperature reaches 145.5° C. At this time, heating ceases, the reactor is Cooled to room temperature (24° C.) and the contents are diluted with methylene chloride (500 milliliters). The product solution is washed with saturated aqueous sodium bicarbonate (300 milliliters) then the recovered organic layer is washed with deionized water (300 milliliters). After drying over a bed of anhydrous sodium sulfate and filtrations the product solution is rotary evaporated under vacuum using final conditions of 140° C. under a 2 mm Hg vacuum for 30 minutes. The product is recovered as a dark purple solid (183.75 grams). Infrared spectrophotometric analysis of a film sample of the product on a potassium chloride plate reveals the presence of the ester carbonyl absorbance at 1722 cm$^{-1}$, the phenolic hydroxyl absorbance at 3416 cm$^{-1}$) and complete disappearance of the carboxylic acid carbonyl absorbance. Thin layer chromatography of a portion of the product on a silica gel plate using a 3/2/2/2 volume mixture of hexane/ethyl acetate/chloroform/methanol as the eluent followed by visualization via treatment of the plate with 5% phosphomolybdic acid in ethanol then heat, versus standards comprising p-2-hydroxyethylether of biphenyl and 4,4'-bis(4-hydroxyphenyl)valeric acid demonstrates that total conversion of the reactants to a single product has occurred.

C. Preparation of Dicyanate of the p-Phenylphenoxyethylester of 4,4'-bis(4-Hydroxyphenyl)valeric Acid The p-phenylphenoxyethylester of 4,4'-bis(4-hydroxyphenyl)valeric acid (96.51 grams, 0.40 hydroxy-equivalent) prepared in B above, cyanogen bromide (44.49 grams, 0.42 mole) and acetone (600 milliliters) are added to a reactor and maintained under a nitrogen atmosphere with stirring. The stirred solution is cooled to −5° C., then triethylamine (40.67 grams, 0.402 mole) is added to the reactor over a 20 minute period and so as to maintain the reaction temperature at −5° to −3° C. After completion of the triethylamine addition, the reactor is maintained at −5° to −4° C. for an additional 40 minutes followed by addition of the reactor contents to deionized water (0.5 gallon). After 5 minutes, the water and product mixture was multiply extracted with three 250 milliliter volumes of methylene chloride. The combined methylene chloride extract is washed with two 500 milliliter portions of deionized water, then dried over anhydrous sodium sulfate. The dry methylene chloride extract is filtered and solvent removed by rotary evaporation using final conditions of 120° C. under a 5 mm Hg vacuum for 30 minutes. The dicyanate of the p-phenylphenoxyethylester 4,4'-bis(4-hydroxyphenyl)valeric acid (101.05 grams) is recovered as a tacky light amber colored transparent solid. infrared spectrophotometric analysis of a film sample of the product on a potassium chloride plate reveals the presence of the ester carbonyl absorbance at 1736 cm$^{-1}$ and complete disappearance of the phenolic hydroxyl absorbance.

EXAMPLE 2

A. Synthesis of p-2-Hydroxyethylether of Stilbene

4-Hydroxystilbene (62.50 grams, 0.3185 mole), ethylene carbonate (30.85 grams, 0.3503 moles) and 4-(N,N-dimethylamino)pyridine (0.10% wt. of total reactants, 0.0934 gram) are added to a 1 liter glass resin kettle reactor equipped with a nitrogen inlet, a thermometer with temperature sensor and controller for a pair of external heating lamps, a paddle type mechanical stirrer and a chilled water condenser. Heating commences concurrent with stirring and once a temperature of 80° C. is achieved triethylamine (1.0% wt. of total reactants, 0.934 gram) is added to the reactor. Heating continues until a temperature of 135° C. is achieved. At this temperature, the reaction product is a powdery slurry. Additional heating to 155° C. produces a light amber colored solution. After cooling of the reactor exterior over the next eight minutes, a temperature of 135° C. is reachieved with the reaction product staying as a light amber colored solution. After 76 minutes at the 135° C. reaction temperatures thin layer chromatography of a portion of the product on a silica gel plate using a 3/2/2/2 volume mixture of hexane/ethyl acetate/chloroform/methanol as the eluent followed by visualization via treatment of the plate with 5% phosphomolybdic acid in ethanol then heat, versus a 4-hydroxystilbene standard ($R_f$=0.89) demonstrates that total conversion of the reactants to a single product ($R_f$=0.80) has occurred. The product is poured into cold toluene (575 milliliters) then heated to reflux to put all precipitated crystalline product into solution. The solution is maintained at room temperature (25° C.) for 6 hours then the recrystallized product removed via filtration. After washing in the filter with cold toluene (50 milliliters), the product is recovered and dried in a vacuum oven at 80° C. and 5 mm Hg. The constant weight of the product is recovered (72.10 grams) as shimmering crystalline white plates. Proton magnetic resonance spectroscopy confirmed the product structure for the p-2-hydroxyethylether of stilbene.

B. Esterification of 4,4'-bis(4-Hydroxyphenyl)valeric acid with p-2-Hydroxyethylether of Stilbene 4,4'-bis(4-Hydroxyphenyl)valeric acid (84.72 grams, 0.2959 mole), p-2-hydroxyethylether of stilbene from A above (71.10 grams, 0.2959 mole), xylene (1250 milliliters) and p-toluenesulfonic acid (2.20 grams, 2.6% wt. of 4,4'-bis(4-hydroxyphenyl)valeric acid used) are added to a 2 liter glass resin kettle reactor outfitted with a nitrogen inlet, a thermometer with temperature sensor and controller for a pair of external heating lamps, a paddle type mechanical stirrer and a Dean Stark trap—chilled water condenser assembly. Heating commences concurrent with stirring under a nitrogen atmosphere (2.0 liters per minute). Once a temperature of 126° C. is achieved, the first drop of distillate is collected into the Dean Stark trap. After an additional 52 minutes, the reaction temperature reaches 141° C., the slurry becomes a clear purple colored solution and a cumulative total of 95 milliliters of cloudy distillate is collected through the Dean Stark trap and discarded, with 1 milliliter of this distillate being a clear bottom layer of water. After an additional 16 minutes, the reaction temperature reaches 142° C. and a cumulative total of 145 milliliters of distillate is collected through the Dean Stark trap and discarded. At this time the overhead distillate is free of cloudiness, thus the xylene is allowed to fill the Dean Stark trap and recycle back to the reactor for the duration of the reaction. After an additional 297 minutes of reaction, the reaction temperature reaches 143° C. At this time, heating ceases and the reactor is cooled to room temperature (25° C.). The product which has precipitated to the bottom of the reactor is recovered by decantation to remove the xylene. The product thus recovered is a brittle purple solid which is ground to a fine powder then washed as a slurry with saturated aqueous sodium bicarbonate (300 milliliters). The powder product is recovered by filtration and then is washed with deionized water (300 mililiters). After recovery by filtration, the product is dried in a vacuum oven at 110° C. and 2 mm Hg to a constant weight (115.0 grams) of gray colored solid. Titration of a portion (0.2777 grams) of the product mixed in acetone (35 milliliters) for acidity reveals no residual acidity present in the product. Infrared spectrophotometric analysis of a potassium chloride pellet of the product reveals the presence of the ester carbonyl absorbance at (1722 cm$^{-1}$, the phenolic hydroxyl absorbance at 3409 cm$^{-1}$ and complete disappearance of the carboxylic acid carbonyl absorbance.

C. Preparation of Dicyanate of 4,4'-bis(4-Hydroxyphenyl)valeric acid Esterified with p-2-Hydroxyethylether of Stilbene 4,4'-bis(4-Hydroxyphenyl)valeric acid esterified with the p-2-hydroxyethylether of stilbene (25.43 grams, 0.10 hydroxyl equivalent) prepared in B above, cyanogen bromide (11.12 grams, 0.105 mole) and acetone (1000 milliliters) are added to a reactor and maintained under a nitrogen atmosphere with stirring. The stirred solution is cooled to −5° C., then triethylamine (10.17 grams, 0.1005 mole) is added to the reactor over a 15 minute period and so as to maintain the reaction temperature at −5° to −4° C. After completion of the triethylamine addition, the reactor is maintained at −5° to −3° C. for an additional 65 minutes followed by addition of the reactor contents to deionized water (5 liters). A first batch of product is recovered by filtration, ground to a fine powder, then is washed with three 400 milliliter portions of deionized water. A second batch of product is recovered by multiply extracting the filtrate with three 400 milliliter volumes of methylene chloride. The combined methylene chloride extract is washed two 500 milliliter portions of deionized water, then dried over anhydrous sodium sulfate. The dry methylene chloride extract is filtered and solvent removed by rotary evaporation under a vacuum using final conditions of 110° C. under a 5 mm Hg vacuum for 30 minutes to provide a light amber colored transparent solid (9.84 grams). The dicyanate recovered from the direct filtration is dried in a vacuum oven at 100° C. and 5 mm Hg to a constant weight (15.54 grams) of light tan colored solid. Infrared spectrophotometric analysis of a potassium chloride pellet of the product from the direct filtration reveals the presence of the ester carbonyl absorbance at 1735 cm$^{-1}$, the cyanate absorbance at 2273 and 2240 cm$^{-1}$ and complete disappearance of the phenolic hydroxyl absorbance.

D. Characterization of the Dicyanate of 4,4'-bis(4-Hydroxyphenyl)valeric acid Esterified with p-2-Hydroxyethylether of Stilbene for Cure by Differential Scanning Calorimetry A portion (9.41 milligrams) of the dicyanate of 4,4'-bis(4-hydroxyphenyl)valeric acid esterified with p-2-hydroxyethylether of stilbene from C above is analyzed by differential scanning calorimetry using a heating rate of 10° C. per minute and a temperature range of 30° to 400° C. under a stream of nitrogen flowing at 35 cubic centimeters per minute. A single endotherm beginning at 74° C., ending at 100° C. with a peak at 85° C. and an enthalpy of 4.8 J/g is observed followed by an exotherm beginning at 119° C., ending at 338° C. with a peak at 226° C. and an enthalpy of 179.9 J/g. This exothermic cure is followed by exothermic decomposition at an onset temperature of 348° C.

EXAMPLE 3

Characterization of the Dicyanate of 4,4'-bis(4-Hydroxyphenyl)valeric acid Esterified with p-2-Hydroxyethylether of Stilbene for Liquid Crystallinity Analysis of the dicyanate of 4,4'-bis(4-hydroxyphenyl)valeric acid esterified with p-2-hydroxyethylether of stilbene via crosspolarized light microscopy is completed using a microscope equipped with a temperature programmable hot stage using a heating rate of 10° C. per minute. The dicyanate sample placed between two glass slides shows no melt when heated from 30° to 300° C. but darkens to a brown powder. A second sample between two glass slides is introduced on to the hot stage which has been preheated to 280° C. Immediate flow is observed with the appearance of a birefringent morphology. The birefringent fluid solidified after 15 seconds to a rigid birefringent solid which firmly bonds the two glass microscope slides together. Shearing of the fluid sample maintained at 280° C. induces birefringent striations in the direction of the shear force.

EXAMPLE 4

A. Synthesis of 4-Hydroxybenzanilide p-Hydroxybenzoic acid (96.68 grams, 0.70 mole), sodium ethoxide catalyst (0.218 gram, 0.225% wt. of the p-hydroxybenzoic acid used) and N,N'-dimethylacetamide solvent (550 grams) are added to a reactor equipped with a reflux condenser and stirred under a nitrogen atmosphere at 23° C. to provide a solution. Phenyl isocyanate (87.55 grams, 0.735 mole) is added inducing a maximum exotherm of 46° C. four minutes later. Three minutes after the maximum exotherm temperature is achieved, heating of the reactor commences and a 160° C. reaction temperature is achieved 94 minutes later. After three hours at the 160° C. reaction temperature, the reactor is cooled to 50° C. then the contents poured into 4 liters of deionized water. A precipitated product is recovered via filtration of the aqueous slurry, washed with deionized water (500 milliliters) then dissolved into boiling methanol (850 milliliters) and refluxed therein (67° C.). After cooling the methanol solution to room temperature (23° C.) and maintaining therein for sixteen hours, a white crystalline product is filtered off, washed with methanol (100 milliliters) and dried in a vacuum oven at 80° C. and 1 mm Hg to a constant weight of 99.49 grams. Fourier transform infrared spectrophotometric analysis of a potassium bromide pellet of a portion of the product revealed the presence of the expected hydroxyl group O—H and secondary amide (solid state) N—H stretching at 3336 cm$^{-1}$ (sharp) with a shoulder at 3409 cm$^{-1}$ and the secondary amide carbonyl stretching (solid state) at 1656 cm$^{-1}$ (sharp).

B. Synthesis of p-2-Hydroxyethylether of Benzanilide

4-Hydroxybenzanilide (95.95 grams, 0.45 mole), ethylene carbonate (43.59 grams, 0.495 mole), 4-(N,N-dimethylamino)pyridine (0.10% wt. of total reactants, 0.1395 gram) and triethylamine (1.0% wt. of total reactants, 1.395 grams) are added to a 2 liter glass three neck round bottom reactor equipped with a nitrogen inlet, a thermometer with temperature sensor and controller for a pair of external heating lamps, a paddle type mechanical stirrer and a glycol condenser cooled to −5° C. Heating commences concurrent with stirring and once a temperature of 124° C. is achieved a slurry forms. Heating continued until a temperature of 140° C. was achieved. At this temperature, the reaction product is a solution. After 188 minutes at the 140° C. reaction temperature, high pressure liquid chromatography of a portion of the product reveals that total conversion of the 4-hydroxybenzanilide reactant has occured. The product is diluted with toluene (1600 milliliters) then heated to reflux to put all precipitated crystalline product into solution. The solution is maintained at room temperature (23° C.) for 16 hours then the recrystallized product removed via filtration. After washing in the filter with cold toluene (150 milliliters), the product is recovered then added to a beaker and boiled in enough acetonitrile to form a solution (700 milliliters). The solution is maintained at room temperature for 18 hours then the recrystallized product is removed via filtration. After washing in the filter with cold acetonitrile (100 milliliters), the product is dried in a vacuum oven at 80° C. and 1 mm Hg to a constant weight of 79.8 grams of white crystalline powder. High pressure liquid chromatographic analysis of a portion of the product indicated the presence of a single product peak. Proton magnetic resonance spectroscopy confirmed the product structure for the p-2-hydroxyethylether of benzanilide.

C. Esterification of 4,4'-bis(4-Hydroxyphenyl)valeric acid with p-2-Hydroxyethylether of Benzanilide 4,4'-bis(4-hydroxyphenyl)valeric acid (28.63 grams, 0.10 mole), p-2-hydroxyethylether of benzanilide from B above (25.73 grams, 0.10 mole), xylene (500 grams) and p-toluenesulfonic acid (0.745 grams, 2.6% of 4,4'-bis(4-hydroxyphenyl)valeric acid used) are added to a 2 liter glass resin kettle reactor outfitted with a nitrogen inlet, a thermometer with temperature sensor and controller for a pair of external heating lamps, a paddle type mechanical stirrer and a Dean Stark trap—chilled water condenser assembly. Heating commences concurrent with stirring under a nitrogen atmosphere (2.0 liters per minute). Once a temperature of 0° C. is achieved, the first drop of distillate is collected into the Dean Stark trap. After 263 minutes at the 140° C. temperature, a total of 110 milliliters of distillate collects into the Dean Stark trap and is discarded, with 1 milliliter of this distillate being a clear bottom layer of water. After an additional 23 hours of reaction, heating ceases, the reactor is cooled to room temperature (23° C.) and the xylene is decanted away from the precipitated product. The product is boiled in methylene chloride (500 milliliters), cooled to room temperature, and the methylene chloride is decanted away from the product. The product is dried under vacuum using at 140° C. and 1 mm Hg to a constant weight of 47.9 grams of brittle amber colored solid. Fourier transform infrared spectrophotometric analysis of a potassium bromide pellet of the product reveals the presence of the ester carbonyl absorbance at 1736 cm$^{-1}$, the phenolic hydroxyl O—H and secondary amide (solid state) N—H absorbance at 3376 cm$^{-1}$, the secondary amide carbonyl stretching (solid state) at 1649 cm$^{-1}$ and complete disappearance of the carboxylic acid carbonyl absorbance.

D. Preparation of Dicyanate of 4,4'-bis(4-Hydroxyphenyl)valeric Acid Esterified with p-2-Hydroxyethylether of Benzanilide 4,4'-bis(4-Hydroxyphenyl)valeric acid esterified with the p-2-hydroxyethylether of benzanilide (13.14 grams, 0.05 hydroxyl equivalent) prepared in C above, cyanogen bromide (5.56 grams, 0.0525 mole) and acetone (100 milliliters) are added to a reactor and maintained under a nitrogen atmosphere with stirring, The stirred solution is cooled to −5° C., then triethyiamine (5.08 grams, 0.0503 mole) is added to the reactor over a 10 minute period and so as to maintain the reaction temperature at −6° to −4° C. After completion of the triethylamine addition, the reactor is maintained at −6° to −4° C. for an additional 45 minutes followed by addition of the reactor contents to deionized water (2 liters). The product is recovered by multiply extracting the filtrate with four 200 milliliter volumes of methylene chloride. The combined methylene chloride extract is washed two 250 milliliter portions of deionized water, then dried over anhydrous sodium sulfate. The dry methylene chloride extract is filtered and solvent removed by rotary evaporation under a vacuum using final conditions of 70° C. under a 1 mm Hg vacuum for 120 minutes to provide a light amber colored transparent solid (14.21 grams). Extraction of a portion (2.0 grams) of the the dicyanate product with hexane (75 mililiters) is completed on a ultrasonic bath for one hour, followed by decantation to remove the hexane extract. Repeating the extraction two additional times provides the dicyanate as a pale yellow colored crystalline powder. Infrared spectrophotometric analysis of a potassium bromide pellet of the extraction purified product reveals the presence of the ester carbonyl absorbance at 1736 cm$^{-1}$, the secondary amide (solid state) N—H absorbance at 3369 cm$^{-1}$, the secondary amide carbonyl stretching (solid state) at 1669 cm$^{-1}$ and the cyanate absorbance at 2273 and 2240 cm$^{-1}$.

E. Characterization of the Dicyanate of 4,4'-bis(4-Hydroxyphenyl)valeric Acid Esterified with p-2-Hydroxyethylether of Benzanilide For Cure By Differential Scanning Calorimetry A portion (14.4 milligrams) of the dicyanate of 4,4'-bis(4-hydroxyphenyl)valeric acid esterified with p-2-hydroxyethylether of benzanilide from D above is analyzed by differential scanning calorimetry using a heating rate of 10° C. per minute and a temperature range of 30° to 300° C. under a stream of nitrogen flowing at 35 cubic centimeters per minute. A single exotherm beginning at 154° C., ending at 265° C. with a peak at 196° C. and an enthalpy of 203.2 J/g is observed. This exothermic cure is followed by a minor endotherm with a peak at 267° C. and an enthalpy of 0.643 J/g. Gradual exothermic decomposition begins at the 274° C. ending of the endothermic event.

EXAMPLE 5

Characterization of the Dicyanate of 4,4'-bis(4-Hxdroxyphenyl)valeric Acid Esterified with p-2-Hydroxyethylether of Benzanilide for Liquid Crystallinity Analysis of the dicyanate of 4,4'-bis(4-hydroxyphenyl)valeric acid esterified with p-2-hydroxyethylether of benzanilide via crosspolarized light microscopy is completed using a microscope equipped with a temperature programmable hot stage using a heating rate of 10° C. per minute. The dicyanate sample placed between two glass slides is a birefringent. crystalline solid at 25° C. Upon heating, the first fluidity occurs at 69° C. as the coverslip is compressed on the glass slide, inducing shear birefringence. At 158° C., the fluid viscosity increases with only slight birefringence observable upon shearing. At 176° C., the fluid becomes highly viscous, followed by thermosetting at 185° C. The thermoset product exhibits birefringent striations when scratched with a steel needle.

EXAMPLE 6

Copolymerization of the Dicyanate of 4,4'-bis(4-Hydroxyphenyl)valeric acid Esterified with p-2-Hydroxyethylether of Benzanilide and the Diglycidyl Ether of 4,4'-Dihydroxybenzanilide and Characterization by Differential Scanning Calorimetry A portion (0.0856 gram, 0.2974 cyanate millequivalents) of the dicyanate of 4,4'-bis(4-hydroxyphenyl)valeric acid esterified with p-2-hydroxyethylether of benzanilide from Example 4-D and the diglycidyl ether of 4,4'-dihydroxybenzanilide having an epoxide equivalent weight of 178.0 (0.05295 gram 0.2974 epoxide millequivalent) are ground together to provide a homogeneous powder. A portion (10.8 milligrams) of the powder is analyzed by differential scanning calorimetry using a heating rate of 10° C. per minute and a temperature range of 30° to 300° C. under a stream of nitrogen, flowing at 35 cubic centimeters per minute. A single exotherm beginning at 145° C., ending at 278° C. with a peak at 205° C. and an enthalpy of 381.2 J/g is observed. Prior to this exothermic event, a gradual negative heat flow (endothermic) is noted commencing at 100° C.

EXAMPLE 7

Characterization of the Blend of the Dicyanate of 4,4'-bis(4-Hydroxyphenyl)valeric acid Esterified with p-2-Hydroxyethylether of Benzanilide and the Diglycidyl Ether of 4,4'-Dihydroxybenzanilide for Liquid Crystallinity Analysis of the blend of the dicyanate of 4,4'-bis(4-hydroxyphenyl)valeric acid esterified with p-2-hydroxyethylether of benzanilide and the diglycidyl ether of 4,4'-dihydroxybenzanilide via crosspolarized light microscopy are completed using a microscope equipped with a temperature programmable hot stage using a heating rate of 10° C. per minute. The blend sample placed between two glass slides is birefringent, crystalline solid at 25° C. Upon heating, the first fluidity occurs at 71° C. as the coverslip is compressed on the glass slide, inducing shear birefringence. At 122° C., the fluid is highly birefringence. At 133° C., the birefringence in the fluid begins to clear with only localized birefringent specks observable at 149° C. Isotropization occurs at 164° C., followed by substantial increase in viscosity at 171° C. Thermosetting occurs at 177° C. providing a highly birefringent solid as the coverslip is compressed on the glass slide. The thermoset product continued to exhibit birefringence when compressed at the 200° C. end of the analysis. The thermoset product exhibits birefringent striations when scratched with a steel needle.

EXAMPLE 8

Preparation of a Casting of the Dicyanate of 4,4'-bis(4-Hydroxyphenyl)valeric acid Esterified with p-2-Hydroxyethylether of Benzanilide and the Blend of the Dicyanate with the Diglycidyl Ether of 4,4'-Dihydroxybenzanilide A portion (0.2 grams) of the dicyanate of 4,4'-bis(4-hydroxyphenyl)valeric acid esterified with p-2-hydroxyethylether of benzanilide from Example 4-D and the portion of the blend of the dicyanate of 4,4'-bis(4-hydroxyphenyl)valeric acid esterified with p-2-hydroxyethylether of benzanilide and the diglycidyl ether of 4,4'-dihydroxybenzanilide remaining from Example 6 are added to aluminum dishes and placed in a forced air convection type oven. Heating to 177° C. commences and this temperature is maintained for two hours, followed by heating to 200° C. After two hours at 200° C., the temperature is increased to 230° C. and maintained therein for two hours. After slowly cooling to room temperature, the pair of castings are removed, demolded, and 30 milligram portions subjected to differential scanning calorimetry using a heating rate of 10° C. per minute and a temperature range of 30° to 300° C. under a stream of nitrogen flowing at 35 cubic centimeters per minute. The homopolymerized dicyanate possesses a midpoint glass transition temperature of 136° C., while the copolymer of the blend possesses a midpoint glass transition temperature of 155° C.

What is claimed is:

1. A diphenol represented by the following Formula II

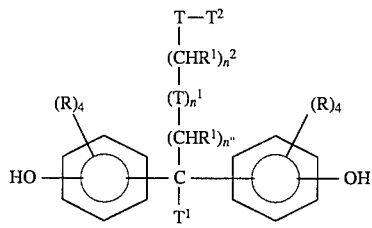

Formula II wherein each R is independently hydrogen or a hydrocarbyl or hydrocarbyloxy group having from 1 to about 10 carbon atoms, a halogen atom, a nitro group, a nitrile group, a phenyl group, or a —CO—$R^1$ group; each $R^1$ is independently hydrogen or a hydrocarbyl group having from 1 to about 3 carbon atoms; $n^1$ has a value of zero or one and $n^2$ has a value of zero to about 10, with the proviso that when $n^1$ has a value of 1, $n^2$ has a value of 1 to about 10; $n''$ independently has a value of zero to about 10; each T is independently a —$NR^1$—, —O—, —S—, —CO—O—, —O—CO—, —$NR^1$—CO— or —CO—$NR^1$— group; $T^1$ is —H, —$(CHR^1)_{n''}$—$CH_2R^1$ or —$(CHR^1)_{n''}$—$(T)_{n^1}$—$(CHR^1)_{n^2}$—T—$T^2$, and $T^2$ is a

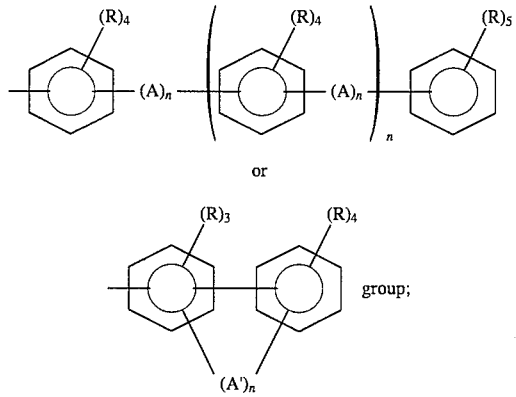

wherein at least about 80 percent of the —A— linkages, the direct bond and the aromatic ring bonding position are in the para position with respect to each other; each A is independently —$CR^1$=$CR^1$—, —C≡C—, —N=N—, —$CR^1$=N—, —O—CO—, —$NR^1$—CO—, —$CR^1$=N—N=$CR^1$—, —$CR^1$=$CR^1$—CO—, —CO—O—, —CO—$NR^1$—, —CO—$CR^1$=$CR^1$—, —$CR^1$=$CR^1$—O—CO—$(CH_2)_{n''}$—, —N=$CR^1$—, —$(CH_2)_n$—CO—O—$CR^1$=$CR^1$—, —$CR^1$=$CR^1$—O—CO—, —CO—O—$CR^1$=$CR^1$—, —CO—O—N=$CR^1$—, —$CR^1$=N—O—CO—, —$CR^1$=$CR^1$—CO—O—, —CO—S—, —O—CO—$CR^1$=$CR^1$—, —$CR^1$=$CR^1$—CO—O—$(CH_2)_{n''}$—, —S—CO—, —$(CH_2)_{n''}$—O—CO—$CR^1$'$CR^1$—, —$CHR^1$—$CHR^1$—CO—O—, —O—CO—$CHR^1$—$CHR^1$—, —C≡C≡C—, —$CR^1$=$CR^1$—$CR^1$=$CR^1$—, —CO—$NR^1$—$NR^1$—CO—,

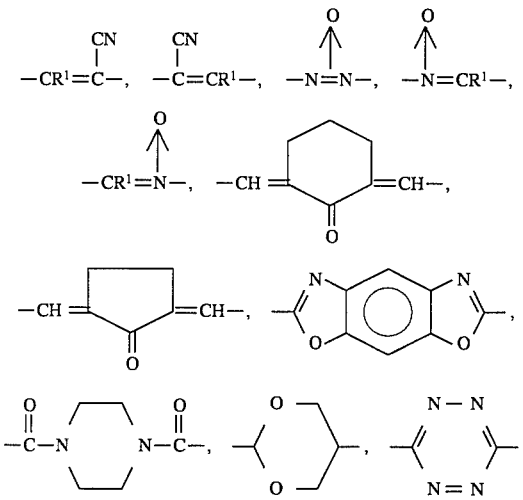

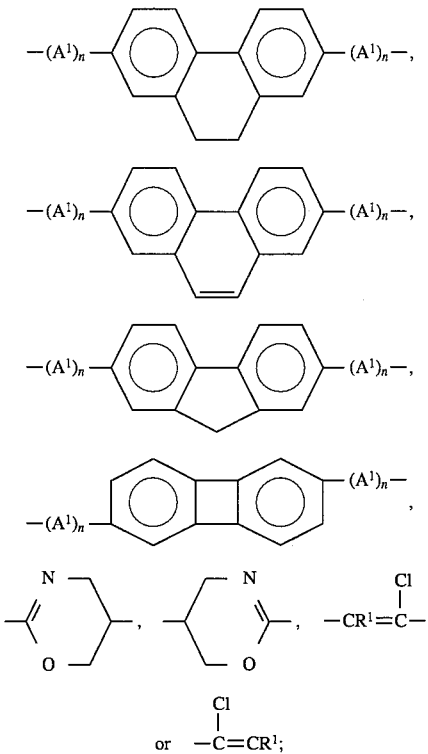

each A' is independently a divalent hydrocarbyl group having from 1 to about 10 carbon atoms; $A^1$ is independently a —CO—, —O—CO—, —CO—O—, —CO—$NR^1$—, or —$NR^1$—CO— group; n has a value of zero or one and n' has a value from 1 to about 6; q has a value of 1 or 2 and wherein the aromatic rings can also contain one or more heteroatoms selected from N, O, or S.

2. A diphenol of claim 1 wherein when R is a hydrocarbyl or hydrocarbyloxy group it has from 1 to about 4 carbon atoms and when it is a halogen it is chlorine or bromine, n" has a value of zero to about 4, A' has from 1 to about 4 carbon atoms and n' has a value of 1 to about 3.

* * * * *